United States Patent
Maekawa et al.

(10) Patent No.: US 10,075,111 B2
(45) Date of Patent: Sep. 11, 2018

(54) SEMICONDUCTOR DEVICE AND ELECTRICALLY-POWERED EQUIPMENT

(71) Applicant: Renesas Electronics Corporation, Kawasaki (JP)

(72) Inventors: Atsuko Maekawa, Kawasaki (JP); Yuuki Akashi, Tokyo (JP); Tetsuhiko Inoue, Kawasaki (JP); Futoshi Hosoya, Kawasaki (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 89 days.

(21) Appl. No.: 14/797,103

(22) Filed: Jul. 11, 2015

(65) Prior Publication Data
US 2016/0094168 A1     Mar. 31, 2016

(30) Foreign Application Priority Data
Sep. 29, 2014   (JP) ................................ 2014-198217

(51) Int. Cl.
*H02P 6/06* (2006.01)
*H02P 6/24* (2006.01)
*H02P 6/18* (2016.01)
*H02P 6/22* (2006.01)
*B25F 5/00* (2006.01)

(52) U.S. Cl.
CPC .................. *H02P 6/24* (2013.01); *B25F 5/00* (2013.01); *H02P 6/18* (2013.01); *H02P 6/22* (2013.01)

(58) Field of Classification Search
CPC ..................................... H02P 6/24; H02P 6/18
USPC ...................................................... 318/400.06
See application file for complete search history.

(56) References Cited

U.S. PATENT DOCUMENTS 5,254,914 A * 10/1993 Dunfield ................... H02P 6/22
                                                    318/400.09
5,616,994 A *  4/1997 Nagaoka .................. H02P 6/06
                                                    318/400.04
5,694,010 A * 12/1997 Oomura .................... H02P 6/34
                                                    318/400.07

(Continued)

FOREIGN PATENT DOCUMENTS

JP    2003-319686 A    11/2003
JP    2010-273502 A    12/2010
JP    2013-192428 A     9/2013

OTHER PUBLICATIONS

Japanese Office Action dated Mar. 6, 2018, in Japanese Application No. 2014-198217, with an English translation thereof.

(Continued)

*Primary Examiner* — Erick Glass
(74) *Attorney, Agent, or Firm* — McGinn IP Law Group, PLLC.

(57) ABSTRACT

When electricity is supplied sequentially one by one to coils with a plurality of coil phases provided in a stator of a brushless DC motor, detection is made on a difference of signals corresponding to currents flowing respectively to coils with another plurality of coil phases coupled to the electrically conductive coil phases due to an effect of a magnetic flux of a stopped rotor. A stop position of the rotor with respect to the stator is determined, based on the relationship between a result of the detection operation and a coil phase in association with each other.

20 Claims, 20 Drawing Sheets

(56) References Cited

U.S. PATENT DOCUMENTS

| | | | | |
|---|---|---|---|---|
| 5,929,589 A * | 7/1999 | Suzuki | ............... | G05B 19/416 |
| | | | | 318/685 |
| 2007/0018599 A1 * | 1/2007 | Yamamoto | ............. | H02P 6/182 |
| | | | | 318/400.06 |
| 2008/0018279 A1 * | 1/2008 | Fukamizu | ............... | H02P 6/182 |
| | | | | 318/432 |
| 2008/0048598 A1 * | 2/2008 | Shibuya | ................. | H02P 6/185 |
| | | | | 318/400.1 |
| 2010/0295490 A1 | 11/2010 | Kuroshima et al. | | |

OTHER PUBLICATIONS

Zhao Wang et al. "A Position Detection Strategy for Sensorless Surface Mounted Permanent Magnet Motors at Low Speed Using Transient Finite-Element Analysis." *IEEE Transactions on Magnetics*, vol. 48, No. 2. pp. 1003-1006. U.S.A.: IEEE. Jan. 23, 2012.

\* cited by examiner

SEMICONDUCTOR DEVICE AND ELECTRICALLY-POWERED EQUIPMENT

CROSS-REFERENCE TO RELATED APPLICATIONS

The disclosure of Japanese Patent Application No. 2014-198217 filed on Sep. 29, 2014 including the specification, drawings and abstract is incorporated herein by reference in its entirety.

TECHNICAL FIELD

The present invention relates to a semiconductor device for use in drive control of a brushless DC motor, further to an electrically-powered equipment having this semiconductor device applied thereto, and relates to an effective technique applied to a motor control microcontroller or microcomputer of an electric tool, for example, an electric drill.

BACKGROUND ART

A brushless DC motor has a rotor having a permanent magnet with a plurality of poles and a stator having coils of three phases of a plurality of coil phases, for example, U, V, and W. Upon conduction of electricity to a coil with a phase corresponding to the position of the rotor with respect to the stator, the rotor is rotated. A rectangular wave driving technique is relatively a simple technique for the driving control. It is a driving technique for sequentially switching coil phases to be conducted with electricity at every rotation of the rotor by 120 degrees. According to this technique, the permanent magnet of the rotor receives a crossing magnetic field by the coil of the stator, and generation of the rotation magnetic field is controlled for rotation in a predetermined direction at a predetermined speed. According to this technique, for switching the coil phases to be electrically conductive one by one, it is necessary to detect the rotation position of the rotor with respect to the stator one by one.

Japanese Unexamined Patent Application Publication No. 2003-319686 discloses a technique for absolutely detecting the rotation position based on a counter electromotive force of the motor. A motor current is compared with a set current value, using a current comparator unit for detecting the counter electromotive force in two stages, that is, at the elapsed point of a set time of a first ON section set timer and from and after the elapse of a set time of a second ON section set timer. That is, based on a comparison result at the elapsed point of the set time of the first ON section set timer, it is immediately switched to an OFF section, and the minimum ON section is shortened, and the counter electromotive force is not detected. On the other hand, the ON section is kept after the comparison, and the counter electromotive force is absolutely detected, in a section after the elapse of the set time of the counter electromotive force detection permission timer until the elapse of the set time of the second ON section set timer. As a result, when a current value has already reached a comparison reference signal in a counter electromotive force non-detection period, it is possible to avoid a case in which the detection of the counter electromotive force is not possibly performed, thus contributing to avoid an undesired possibility that the rotation position cannot be detected.

SUMMARY

The present inventors have examined the detection of the rotation position when the rotor is started. As described above, in the related art, the rotation position of the rotor is detected by rotating the rotor. Detection is made on an effect of a counter electromotive force of a coil with an electrically non-conductive phase from a permanent magnet of the rotor, for a coil with an electrically conductive phase. That is, at the initiation time when the rotor is stopped, the rotation position of the rotor cannot be estimated using an induced electromotive force. Thus, at the initiation time, a rotation magnetic field is generated by forcedly changing the pattern of electrical conduction toward the coils, regardless of the position of the rotor.

However, accordingly to the present inventors, when the electrical conduction pattern for the coils is forcedly changed regardless of the position of the rotor, the rotor may be rotated in reverse. In this case, the electrical conduction pattern for the coils may need to be changed by detecting whether or nor the reverse rotation is made. In addition, the initiation is delayed, and the cutting blades of the drill may undesirably be deteriorated due to the reverse rotation.

The above and other objects and new features will be obvious from the description of the present specification and the attached drawings.

Of the embodiment disclosed in the present application, the representative embodiment will schematically and briefly be described as follows.

Specifically, when electricity is supplied sequentially one by one to coils with a plurality of coil phases provided in a stator of a brushless DC motor, detection is made on a difference of signals corresponding to currents respectively flowing to coils with different coil phases coupled to the electrically conductive coil phases due to an effect of a magnetic flux of the stopped rotor. The stop position of the rotor with respect to the stator is determined based on the relationship between the detection result and a coil phase in association with each other.

An effect attained by the representative embodiment disclosed in the present application will briefly be described as follows.

That is, the stop position of the rotor can be detected while the rotation thereof is stopped.

DESCRIPTION OF THE PREFERRED EMBODIMENTS

Figure 1:
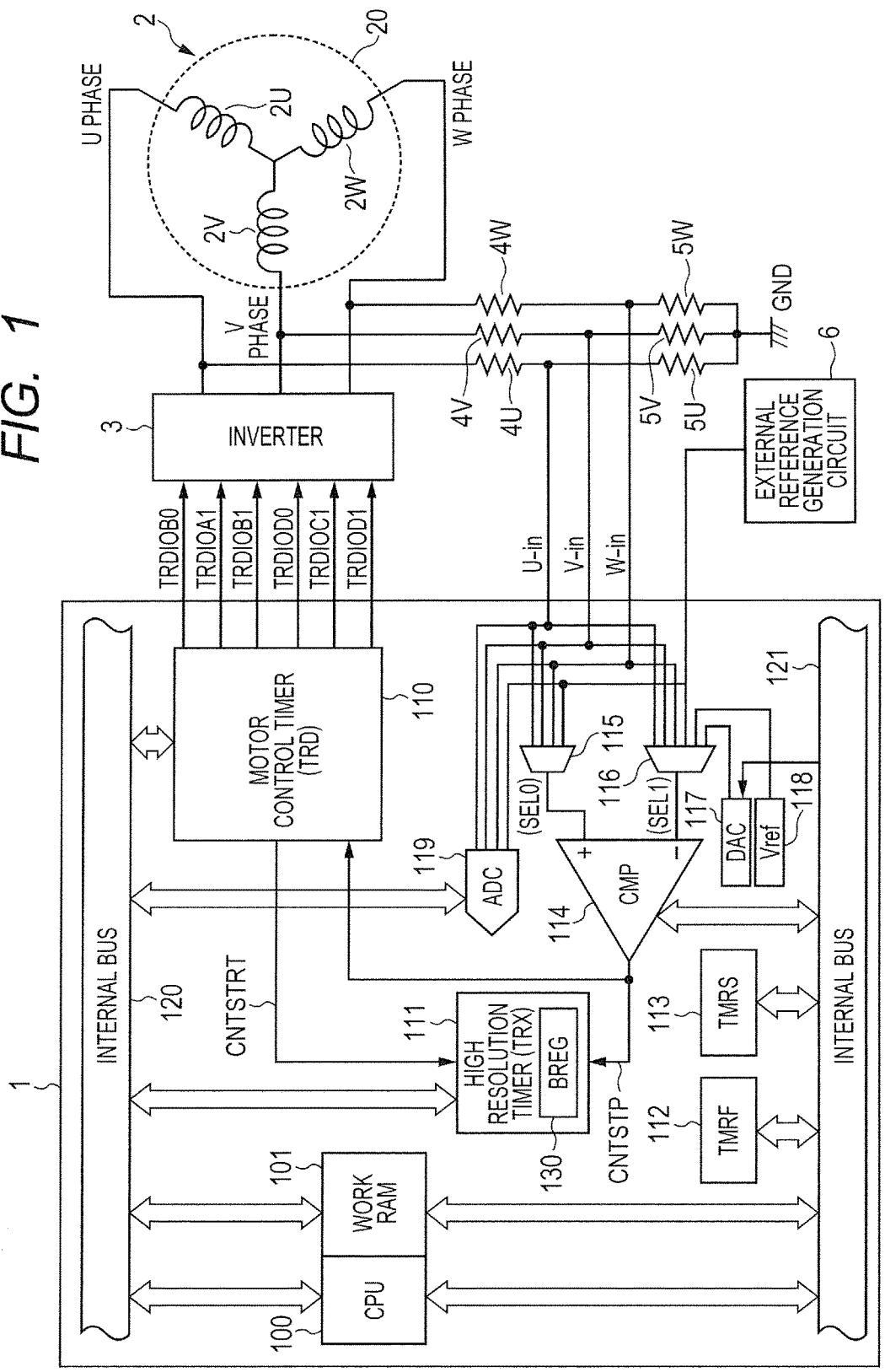
FIG. 1 is a block diagram of a brushless DC motor and a microcontroller as an example of a semiconductor device for use in its drive control.

1. Descriptions will now schematically be made to preferred embodiments disclosed in the present application, firstly, a representative embodiment. In the schematic descriptions for the representative embodiment, those reference numerals of the drawings that are referred in brackets simply exemplify those included in the ideas of the constituent elements with the attached numerals.

[1] <Determine Stop Position of Rotor with Respect to Stator>

A semiconductor device (1) selectively supplies currents to coils (2U, 2V, 2W) with a plurality of coil phases of a brushless DC motor including a rotor (21) having a permanent magnet with a plurality of poles and a stator (20) having the coils with the coil phases, and controls rotation driving of the rotor. When electricity is supplied sequentially to the coil with one coil phase, the semiconductor device detects a difference of signals corresponding to currents flowing respectively to coils with other plurality of coil phases coupled to the electrically supplied coil phase, due to an effect of a magnetic flux of a stopped rotor, thereby determining a stop position of the rotor with respect to the stator, based on the relationship between a detection result and a coil phase in association with each other. An electrically conductive phase of the coil is determined based on the detection result, to start to rotate the rotor in a predetermined direction.

According to this, the currents flowing from the coil with the electrically supplied one coil phase respectively to the coils with other plurality of coil phases coupled thereto change due to an effect of a permanent magnet of the rotor. However, the change depends on the relative position of the magnetic poles of the permanent magnet with the respective coils. The semiconductor device acquires this difference, thereby enabling to detect the stop position while the rotation of the rotor is stopped. Thus, it is possible to prevent reverse rotation of the rotor at the initiation, and to avoid the delay of initiation.

[2] <High-Speed Rotation Control>

In [1], when electricity is conducted from the coil with one coil phase of the coupled coil phases to a coil with another coil phase, switching of the electrically conductive coil phase is performed, based on a timing at which a signal (U-in, V-in, W-in) corresponding to a current flowing to a coil of an electrically non-conductive phase due to an effect of a magnetic flux of the rotor reaches a reference signal (117, 118, or output of 6). High-speed rotation driving of the rotor is controlled.

According to this, in high-speed rotation control, a comparison is made between the signal corresponding to the current flowing to the coil with the electrically non-conductive phase and reference signal. Thus, the circuit detecting the difference of a pair of signals in the initiation control of the rotor in [1] may possibly be used also for a comparison between a pair of signals in the high-speed rotation control of the rotor.

[3] <Low-Speed Rotation Control>

In [2], when electricity is conducted from the coil with one coil phase of the coupled coil phases to a coil with another coil phase, switching of the electrically conductive coil phase is performed, in synchronization with a timing at which there is reversal of a magnitude relation between a signal corresponding to a current flowing to the coil with the electrically non-conductive phase and an average value of the sum of the signal corresponding to the current flowing to the coil with the electrically conductive phase and a signal corresponding to the current flowing to the coil with the electrically non-conductive phase due to the effect of the magnetic flux of the rotor, and low-speed rotation driving of the rotor is controlled.

According to this, in low-speed circuit of the rotor, the current flowing to the coil with electrically non-conductive phase is hardly effected by the magnetic flux or the rotor, taking into consideration of a matter that it is difficult to detect the difference, even if it is compared to the reference signal like the high-speed rotation control. The change speed of the current flowing to the coil with the electrically non-conductive phase is greater than the change speed of the average value of the sum. Thus, based on the time at which the changes cross each other, it is possible to estimate a change in the current flowing to the coil with the electrically non-conductive phase due to the effect of the magnetic flux of the rotor.

[4] <Determine Stop Position of Rotor with Respect to Stator>

In [3], included are a selector circuit (115, 116), a comparator circuit (114) which compares two signals selected by the selector circuit, a timer counter (111) which acquires a count value corresponding to a coincidence detection timing by the comparator circuit. For controlling the determining of the stop position of the rotor with respect to the stator, the selector circuit selects signals corresponding to currents flowing respectively to the coils with the coupled coil phases, the comparator circuit forms a coincidence timing of the signals selected by the selector circuit, the timer counter acquires a count value since a count operation starts in synchronization with a timing of supplying electricity to the coil with one coil phase until the coincidence timing, and the stop position of the rotor with respect to the stator is determined based on the relationship between the acquired count value and the plurality of coil phases in association with each other.

According to this, the selection by the selector circuit selecting the input of the comparator circuit is made using a signal corresponding to the currents flowing respectively to the coils with other plurality of coil phases coupled to the electrically supplied coil. As a result, the comparator circuit can be used for detecting the stop position of the rotor at the initiation time.

[5] <Capture Count Value of Timer Counter>

In [4], the timer counter has a buffer register (130) keeping the count value until the coincidence timing in response to the coincidence.

According to this, it is possible to perform an operation for keeping the count value without going through a software process, such as an interrupt process. Even if the electrically supplied coil phase is changed, it is estimated that only a slight difference exists between coincidence timings of signals corresponding to the currents flowing respectively to the coils of different coil phases coupled to this electrically supplied coil. Thus, if it takes long time to perform a process for determining the count value to be kept, the difference acquired from the count values gets smaller.

[6] <High-Speed Rotation Control>

In [4], for controlling the high-speed rotation driving of the rotor, the selector circuit selects the reference signal and the signal corresponding the current flowing to the coil with the electrically non-conductive phase due to the effect of the magnetic flux of the rotor, the comparator circuit forms a coincidence timing of signals selected by the selector circuit, and the electrical conductive coil phase is controlled to be switched in synchronization with the coincidence timing acquired by the comparator circuit.

According to this, the selector circuit selecting the input of the comparator circuit selects the signal corresponding to the current flowing to the coil with the electrically non-conductive phase with a reference signal. As a result, the comparator circuit can also be used for the high-speed rotation control of the rotor.

[7] <Low-Speed Rotation Control>

In [4], included is an A/D converter circuit (119). For controlling the low-speed rotation driving of the rotor, when electricity is conducted from a coil with one of the coupled coil phases to a coil with another coil phase, the A/D converter converts a signal corresponding to a current flowing to the coil with the electrically conductive phase and a signal corresponding to a current flowing to the coil with the electrically non-conductive phase due to the effect of the magnetic flux of the rotor, and there is obtained a timing at which there is reversal of the magnitude relation using conversion obtained digital signals.

According to this, the A/D conversion circuit converts the signal corresponding to the current flowing to the coil with the electrically-conductive phase and the signal corresponding to the current flowing to the coil with the electrically-conductive phase into digital signals. Thus, it is possible to easily perform an arithmetic process for obtaining the average value of the sum and the process for determining the magnitude relation between the average value of the sum and the signal corresponding to the current flowing to the coil with the electrically non-conductive phase, using an arithmetic process using software of a CPU.

[8] <Electrically-Powered Equipment>

An electrically-powered equipment includes a brushless DC motor (2) which includes a rotor having a permanent magnet with a plurality of poles and a stator having coils of a plurality of coil phases, a semiconductor device (1) which selectively supplies currents to the coil phases of the brushless DC motor, and controls rotation driving of the rotor, and an operative mechanism (210, 211) which operates the brushless DC motor as a power source. When electricity is supplied sequentially to a coil with one coil phase, the semiconductor device detects a difference of signals corresponding to currents flowing respectively to coils with other plurality of coil phases coupled to the electrically supplied coil phase due to an effect of a magnetic flux of a stopped rotor, thereby determining a stop position of the rotor with respect to the stator, based on the relationship between a detection result and the coil phase in association with each other, and an electrically conductive phase of a coil is determined in accordance with the determination result, to start to rotate the rotor in a predetermined direction.

According to this, it is possible to determine the stop position of the rotor with respect to the stator. Thus, it is possible to prevent reverse rotation of the rotor at the initiation time of rotor, and to avoid the delay of the initiation as well. Therefore, it is possible to prevent a bad effect onto an operative mechanism by the reverse rotation of the rotor, and to start an operation by the operative mechanism immediately right after the activation of the rotor, thereby contributing the improvement of the operability by the electrically-powered equipment.

[9] <Determine Stop Position of Rotor with Respect to Stator>

A semiconductor device (1) controls driving of a brushless DC motor (2) including a rotor (21) having a permanent magnet with a plurality of poles and a stator (20) having coils with a plurality of coil phases. The device includes a pulse generation circuit (110) which generates a pulse control signal for selectively supplying currents to the coils with the coil phases of the brushless DC motor, a selector circuit (115, 116) which selects arbitrary two signals, from detection signals corresponding to currents flowing respectively to the coils and a reference signal, a comparator circuit (114) which compares the two signals selected by the selector circuit, a timer counter (111), and a control circuit (100). The control circuit repeatedly controls an operation for the pulse generation circuit to output a pulse control signal for supplying electricity to one of the coil phases in a state where the rotor is stopped, an operation for the selector circuit to select a detection signal corresponding to a current flowing from the electrically supplied coil to two coils with other coil phases coupled thereto, from the detection signals, and an operation for the timer counter to measure a time until determination of a state in which the selected two detection signals coincide with each other based on an output of the comparator circuit, while sequentially switching the electrically supplied coil phases, thereby determining a stop position of the rotor with respect to the stator, based on the relationship between a result of measurement operation by the timer counter and the plurality of coil phases in association with each other.

According to this, a change occurs in the currents flowing from the electrically supplied one coil phase respectively to the coils with other plurality of coil phases coupled thereto, due to an effect of the permanent magnet of the rotor. This change depends on the relative position of the magnetic pole of the permanent magnet relative to the pair of coils. The semiconductor device can acquire the difference, thereby enabling to detect the stop position while the rotation of the rotor is stopped. Thus, it is possible to prevent reverse rotation of the rotor at the initiation time, and to avoid the delay of the initiation. Further, the selection by the selector circuit selecting the input of the comparator circuit is made using the signal corresponding to the currents flowing respectively to the coils with other plurality of coil phases coupled to the electrically supplied coils. As a result, the comparator circuit can be used for detecting the stop position of the rotor at the initiation time.

[10] <Stop Counting of Timer Counter and Capture Count Value>

In [9], the timer counter starts a count operation, based on switching of the electrically supplied coil phases by the control circuit, and stores its count value in a buffer register in accordance with a coincidence output of the comparator circuit.

According to this, the operation for keeping the count value can be performed at high speed without going through a software process, such as an interrupt process.

[11] <Interrupt Process>

In [10], the control circuit controls to output the pulse control signal, controls selection of the selector, and controls initialization of the timer counter, in accordance with an interrupt process in response to the coincidence output of the comparator circuit. The initialization of the timer counter is based on a timing after an operation for storing the count value in the buffer register.

According to this, it is possible to relatively easily define the entire processing procedure for determining the stop position of the rotor with respect to the stator, using an interrupt process by the software.

[12] <High-Speed Rotation Control>

In [9], the control circuit controls, in a high-speed rotation mode, the pulse generation circuit to output a pulse control signal for electrically conducting from a coil with one of the coil phases to a coil with another coil phase, controls the selector circuit to select a reference signal and a signal corresponding to a current flowing to a coil with an electrically non-conductive phase due to an effect of a magnetic flux of the rotor, determines a timing at which the selected signal corresponding to the current flowing to the coil with the electrically non-conductive phase is greater than the reference signal, based on an output of the comparator circuit, and controls switching of coils electrically conducted by the pulse generation circuit, in synchronization with the determined timing.

According to this, the selector circuit selecting the input of the comparator circuit selects the signal corresponding to the current flowing to the coil with the electrically non-conductive phase and a reference signal. As a result, the comparator circuit can be used for controlling high-speed rotation of the rotor.

[13] <Low-Speed Rotation Control>

In [12], further included is an A/D conversion circuit (119) which converts the signal corresponding to the currents flowing to the coils of the stator into a digital signal. The control circuit controls, in a low-speed rotation mode, the pulse generation circuit to output a pulse control signal for electrically conducting the coil with one of the coil phases to the coil with another coil phase, controls the A/D conversion circuit to convert a signal corresponding to currents flowing to the electrically conductive coils and a signal corresponding to a current flowing to an electrically non-conductive coil due to the effect of the magnetic flux of the rotor, into digital signals, and controls switching of coil phases electrically conducted by the pulse generation circuit, in synchronization with a timing at which there is reversal of magnitude relation between an average value of sum of the converted signals and a digital signal of the signal corresponding to the current flowing to the coil with the electrically non-conductive phase.

According to this, the A/D conversion circuit converts the signal flowing to the coil with the electrically conductive phase and the signal corresponding to the current flowing to the coil with the electrically non-conductive phase, into digital signals. Therefore, the arithmetic process for obtaining the average value of the sum and the process for determining the magnitude relation between the average value of the sum and the signal corresponding to the current flowing to the coil with the electrically non-conductive phase can easily be performed using an arithmetic process using the software of a CPU.

[14] <Electrically-Powered Equipment>

An electrically-powered equipment includes a brushless DC motor (2) which includes a rotor (21) having a permanent magnet with a plurality of poles and a stator (20) having coils with a plurality of phases, a semiconductor device (1) which selectively supplies currents to the coil phases of the brushless DC motor, and controls rotation driving of the rotor, and an operative mechanism (210, 211) which operates the brushless DC motor as a power source. The semiconductor device has a pulse generation circuit (110) for generating a pulse control signal for selectively supplying a current to coils with a plurality of phases of the brushless DC motor, a selector circuit (115, 116) for selecting a arbitrary two signals from a reference signal and detection signals corresponding to a current flowing to the coils, a comparator circuit (114) for comparing the two signals selected by the selector circuit, a timer counter (111), and a control circuit (100). The control circuit repeatedly controls an operation for the pulse generation circuit to output a pulse control signal for supplying electricity to one of the coil phases in a state where the rotor is stopped, an operation for the selector circuit to select a detection signal corresponding to a current flowing from the electrically supplied coil to two coils with other plurality of coil phases coupled thereto, from the detection signals, and an operation for the timer counter to measure a time until determination of a state in which the selected two detection signals coincide with each other based on an output of the comparator circuit, while sequentially switching the electrically supplied coil phases, thereby determining a stop position of the rotor with respect to the stator, based on relationship between a result of measurement operation by the timer counter and a coil phase in association with each other.

According to this, the stop position of the rotor can be detected while its rotation is stopped. Thus, it is possible to prevent reverse rotation of the rotor at the initiation time of the rotor, and to avoid the delay of the initiation. Therefore, it is possible to prevent a bad effect onto an operative mechanism by the reverse rotation of the rotor, and to start the operation by the operative mechanism immediately after the activation of the rotor, thereby contributing the improvement of the operability by the electrically-powered equipment.

[15] <Use Same Comparator Circuit and Timer for Determining Stop Position and Rotation Position of Rotor>

A semiconductor device selectively supplies current to a plurality of coil phases of a brushless DC motor (2) including a rotor (21) having a permanent magnet with a plurality of poles and a stator (20) having coils (2U, 2V, 2W) with the coil phases, and controls rotation driving of the rotor. In a stopped state of the rotor, when electricity is supplied sequentially to a coil with one coil phase, detection is made on a difference of signals corresponding to currents flowing respectively to coils with other plurality of coil phases coupled to the electrically supplied coil phase due to an effect of a magnetic flux of a stopped rotor, using a comparator circuit (114) and a timer (111) inputting its comparison result, thereby determining a stop position of the rotor with respect to the stator, based on relationship between a detection result and a coil phase in association with each other. In a rotation state of the rotor, detection is made on a timing at which a signal, corresponding to a current flowing to an electrically non-conductive coil due to the effect of the magnetic flux of the rotor, reaches a reference signal, when electrical conduction is made from a coil with one of the coupled coil phases to a coil with another coil phase, using the comparator circuit and the timer, thereby determining a rotation position of the rotor with respect to the stator.

According to this, it is possible to determine the stop position and rotation position of the rotor with respect to the stator using the same comparator circuit and the timer.

2. Specific Description of Preferred Embodiment

Descriptions will now specifically be made to a preferred embodiment.

<Microcontroller for Controlling Motor>

FIG. 1 illustrates an example of a brushless DC motor and a microcontroller or microcomputer 1 as an example of a semiconductor device for use in its drive control. The microcontroller 1 illustrated in FIG. 1 is formed using a known CMOS (Complementary Metal Oxide Semiconductor) integrated circuit manufacturing technique, over one semiconductor substrate, such as a single-crystal silicon, though a particular restriction is not made thereon.

Figure 2:
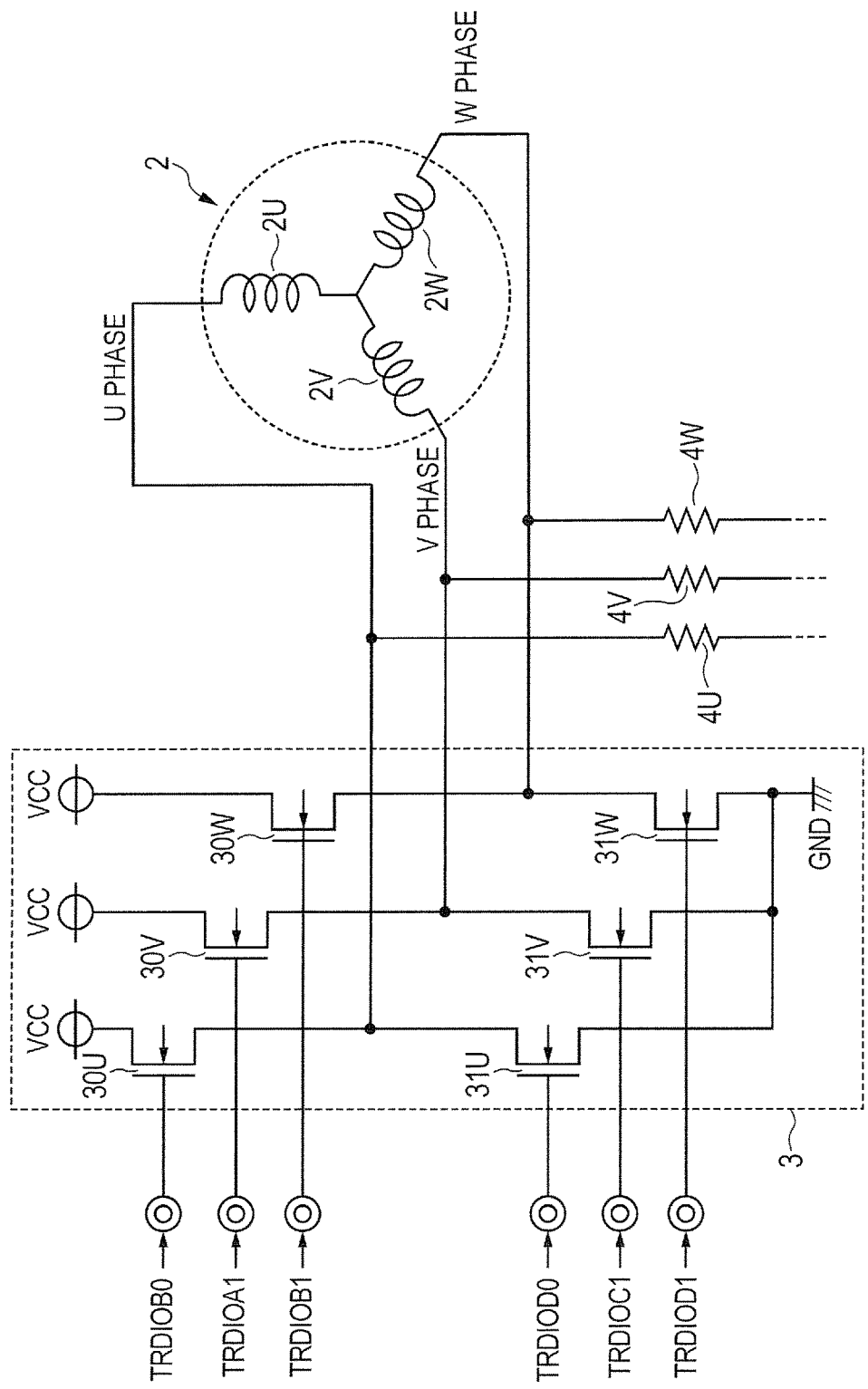
FIG. 2 is a circuitry diagram illustrating an example of a coupling configuration of an inverter and coils.
Figure 3:
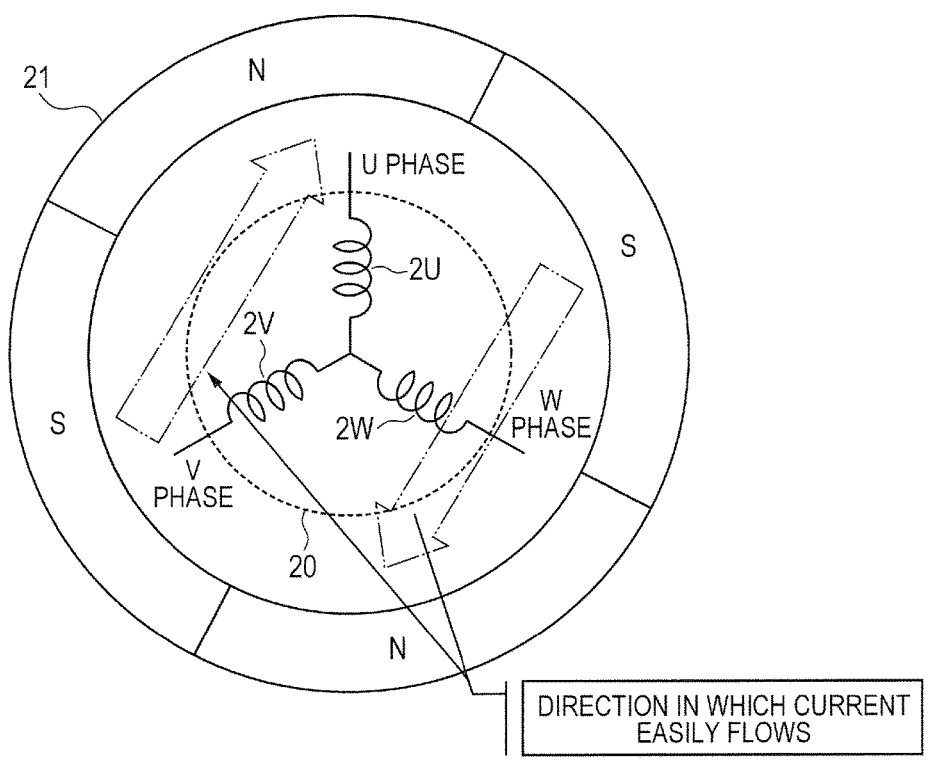
FIG. 3 is an explanatory diagram illustrating an example of the relationship between a stator and a rotor.

A brushless DC motor 2 has a stator 20 having coils 2U, 2V, and 2W of a plurality (three) of coil phases, for example, a U phase, a V phase, and a W phase. A rotor 21 is coaxially arranged with the stator 20, and has a plurality of poles of a permanent magnet, that is, totally four poles of S poles and N poles. An example of the rotor 21 is illustrated in FIG. 3. As illustrated, respective ends of the coils 2U, 2V, and 2W are commonly coupled, and the other ends thereof are coupled to output terminals of an inverter 3 as a driving circuit. A coupling configuration of the inverter 3 and the coils 2U, 2V, and 2W is exemplarily illustrated in FIG. 2. Though a particular restriction is not made, the inverter 3 has push-pull output circuits coupled to the coils 2U, 2V, and 2W corresponding to their respective driving terminals. The respective push-pull output circuits include series circuits of an N-channel current supply MOS transistors 30U, 30V, and 30W and a N-channel current drawing MOS transistors 31U, 31V, and 31W. The MOS transistors 30U, 30V, and 30W are controlled to be switched, when each of the gate electrodes receives a driving control signal TRDIOB0, TRDIOA0, or TRDIOB1 output from the microcontroller 1. The MOS transistors 31U, 31V, and 31W are controlled to be switched, when each of the gate electrodes receives a driving control signal TRDIOD0, TRDIOC1, and TRDIOD1 output from the microcontroller 1.

Brief descriptions will beforehand be made to a rotation magnetic field of the stator that is necessary for rotational driving of the rotor 21. When the coils 2U, 2V, and 2W are coupled to the side of a power source VCC, they are an S pole. When the coils are coupled to the side of the ground GND, they are an N pole. Two electrically conductive coils, of the coils 2U, 2V, and 2W, are sequentially and regularly switched at every rotation of 120 degrees of the rotor, in accordance with the position of the rotor 21 with respect to the stator 20. As a result, a rotation magnetic field for rotating the rotor 21 in a predetermined direction can be formed in the stator 20. For example, when the V-phase coil 2V is electrically conductive from the U-phase coil 2U, the MOS transistors 30U and 31V of the inverter circuit 3 are in an ON state, while the rest of the transistors are in an OFF state. At this time, the W-phase coil 2W is not electrically conductive.

A counter electromotive force is induced in the coils coupled to the current supply and drawing MOS transistors that are in an OFF state, due to an effect from the permanent magnet of the rotor. For detection of a current flowing through the coils 2U, 2V, and 2W by this electromotive force, resistance voltage dividing circuits with a high resistance are provided at coil terminals of the output terminal sides of the inverter circuit 3, and signals U-in, V-in, and W-in are respectively formed therein. The signal U-in is a divided voltage generated by a series circuit with high resistances 4U and 5U. The signal V-in is a divided voltage generated by a series circuit with high resistances 4V and 5V. The signal W-in is a divided voltage generated by a series circuit with high resistances 4W and 5W.

The microcontroller 1 controls to detect the rotation magnetic field or the position of the rotor 21. Though a particular restriction is not made, the microcontroller 1 has the core part for program processes. The core part includes a central processing unit (CPU) 100 for performing an arithmetic process in accordance with a program stored in an external memory or an internal memory and a work RAM 101 for the CPU 100. The microcontroller 1 has a motor control timer (TRD) 110, a high resolution timer (TRX) 111, a first timer (TMRF) 112, and a second timer (TMRS) 113, as timer circuits for controlling the motor in accordance with the program process of its core part. Further, for the measurement operation using the above timer circuits, provided are a comparator circuit (CMP) 114, an input selector (SEL0) 115 of a non-inverted input terminal (+) of the comparator circuit 114, an input selector (SEL1) 116 of an inverted input terminal (−) of the comparator circuit 114, a digital/analog conversion circuit (DAC) 117 forming a reference potential, a reference voltage generation circuit 118, and an analog/digital conversion circuit 119. A necessary data interface is provided between these circuits and the core part of the program process perform through internal buses 120 and 121. The selectors 115 and 116 are examples of selector circuits.

The motor control timer 110 is a timer of 64 MHz count at maximum and specialized for motor control. It generates the driving control signals TRDIOB0, TRDIOA1, TRDIOB1, TRDIOD0, TRDIOC1, and TRDIOD1, using its PWM (Pulse Width Modulation) function. The high resolution timer 111 is a timer of 64 MHz count. Its count value is read in accordance with an interrupt process of the CPU 100, and used for detecting the position of the rotor. The first timer 112 and the second timer 113 are used for generating an interrupt request for the CPU 100.

The selector 115 selects and outputs one of external signals U-in, V-in, W-in and outputs of an external reference generation circuit 6. The other selector 116 selects and outputs one of external signals U-in, V-in, W-in, outputs of the DAC 117, outputs of the reference voltage generation circuit 118, and outputs of the external reference generation circuit 6. The selection modes of the selectors 115 and 116 are set by the CPU 100 in accordance with, for example, a driving control mode of the motor.

The motor control timer 110 performs a PWM operation in accordance with the setting of the CPU 100, and generates driving control signals TRDIOB0, TRDIOA1, TRDIOB1, TRDIOD0, TRDIOC1, and TRDIOD1, for controlling power supply and current drawing to/from the coils of the stator 20. A count operation for the high resolution timer 111 is started in response to a count start signal CNTSTRT from the motor control timer 110.

A comparison result of the comparison circuit 114 is given to the high resolution timer 111 and the motor control timer 110, as a count stop signal CNTSTP, to acquire their counted values and stop the count operation. Though a particular restriction is not made, the comparator circuit 114 outputs a high level pulse signal, when an input of an inverted input terminal (−) is equal to or greater than an input level of the non-inverted input terminal (+). Then, this high level pulse signal is assumed as a count stop signal CNTSTP.

Descriptions will now be made a rotor stop position detection mode at the initiation time, a high-speed rotation mode, and a low-speed rotation mode, as the main driving control mode of the motor 2.

<Detect Stop Position of Rotor at Initiation Time>

The position of the rotor 21 with respect to the stator 20 at the initiation time is detected in a state where the rotor 21 is stopped. The descriptions will firstly be made to the detection principle. If large currents flow to the coils, the rotor can be rotated by a magnetic field formed by the coils. On the other hand, if small currents flow to the coils, the currents hardly flow to the coils, due to an effect of a counter electromotive force by a magnetic force of the rotor. In the example of FIG. 3, as the directions of currents conducted to the coils are along the directions illustrated with arrows, there is a small effect of the counter electromotive force by the rotor 21, and the current easily flows to the coils.

If a current is supplied to a coil with one coil phase in a state where the rotor 21 is stopped, different currents flow to coils, with a plurality of coil phases, coupled to the corresponding coil phase, due to an effect of a magnetic flux of the stopped rotor. For example, in FIG. 3, when a current is supplied to a coil 2U with a U phase, a counter electromotive force induced in a coil 2V with a V phase becomes greater than a counter electromotive force induced in a coil 2W with a W phase, thus resulting in a difference in voltages of the signals V-in and W-in. This difference depends on pairs of stop positions of the stator 20 in relation to the rotor 21 and the respective detected signals U-in, V-in, and W-in. Thus, operations are performed for detecting a signal difference in accordance with currents flowing respectively to the coils 2U, 2V, and 2W with the coil phases, while sequentially switching the coil phases to be supplied with a current one by one. Based on the relationship between a result of the detection operation and the coil phase in association with each other, it is possible to determine the stop position of the rotor 21 with respect to the stator 20. If the stop position of the rotor 21 is found, the rotation magnetic field for starting to rotate the rotor 21 in a predetermined direction in accordance with it may simply be formed in the coils 2U, 2V, and 2W of the stator 20. Based on FIG. 4 or FIG. 9, a concrete example of the detection operation will be described.

Figure 4:
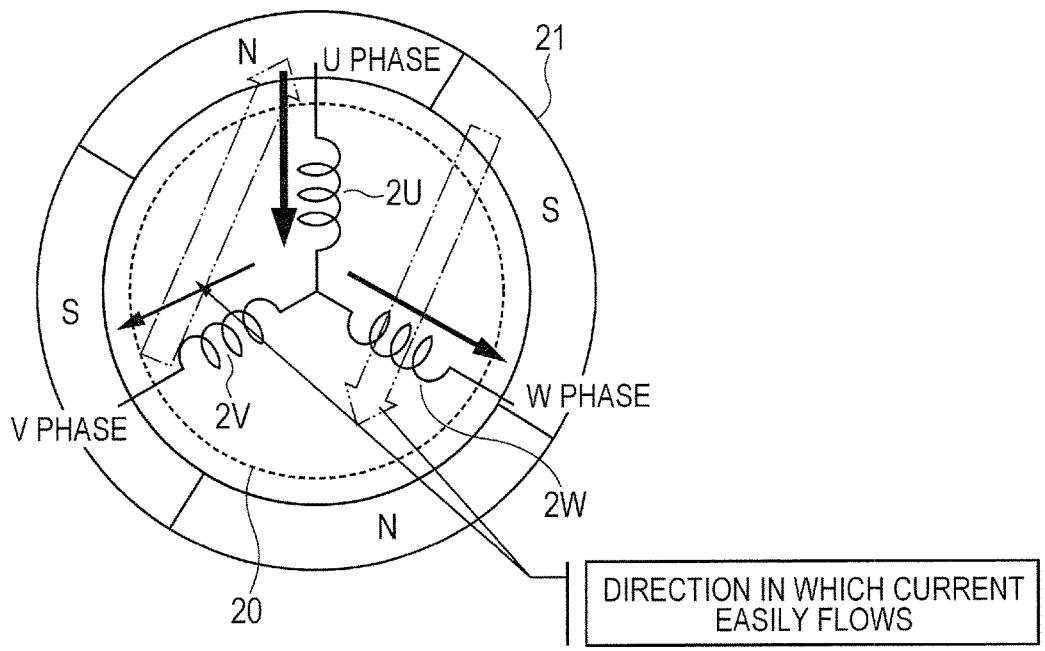
FIG. 4 is an explanatory diagram illustrating an example of the relationship between a rotor and a stator which supplies electricity to a U phase when the rotor is stopped.
Figure 5:
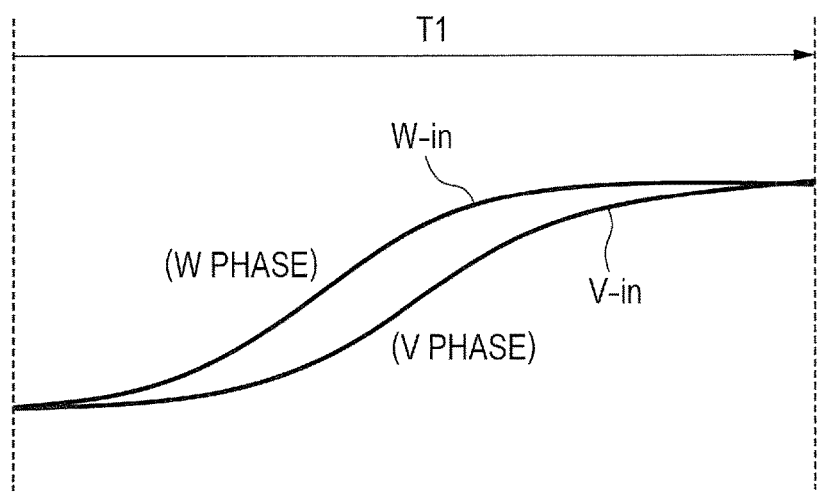
FIG. 5 is an explanatory diagram illustrating an example of signal waveforms of a V phase and a W phase that are effected by a counter electromotive force, when electricity is supplied to the U phase in FIG. 4.

As exemplarily illustrated in FIG. 4, consideration is made to a case where a current is supplied to the coil 2U with the U phase, and the signal V-in from the coil 2V with the V phase and the signal W-in from the coil 2W with the W phase are selected by the selectors 115 and 116, and then input to the comparator circuit 114. In this case, because the coil 2V with the V phase is nearest to the S pole, a current hardly flows due to a large effect of the counter electromotive force. Therefore, the signals V-in and W-in change as illustrated in FIG. 5, and a time T1 is required for matching the voltages. In this example, the comparator circuit 114 outputs a high level pulse signal, when an input of the inverted input terminal (−) is equal to or greater than an input level of a non-inverted input terminal (+). In this case, the selector 115 is controlled to select the signal W-in, while the selector 116 is controlled to select the signal V-in. On the contrary, even if the level of the signal V-in reaches the level of the signal W-in, a significant comparison result pulse signal cannot be attained.

Figure 6:
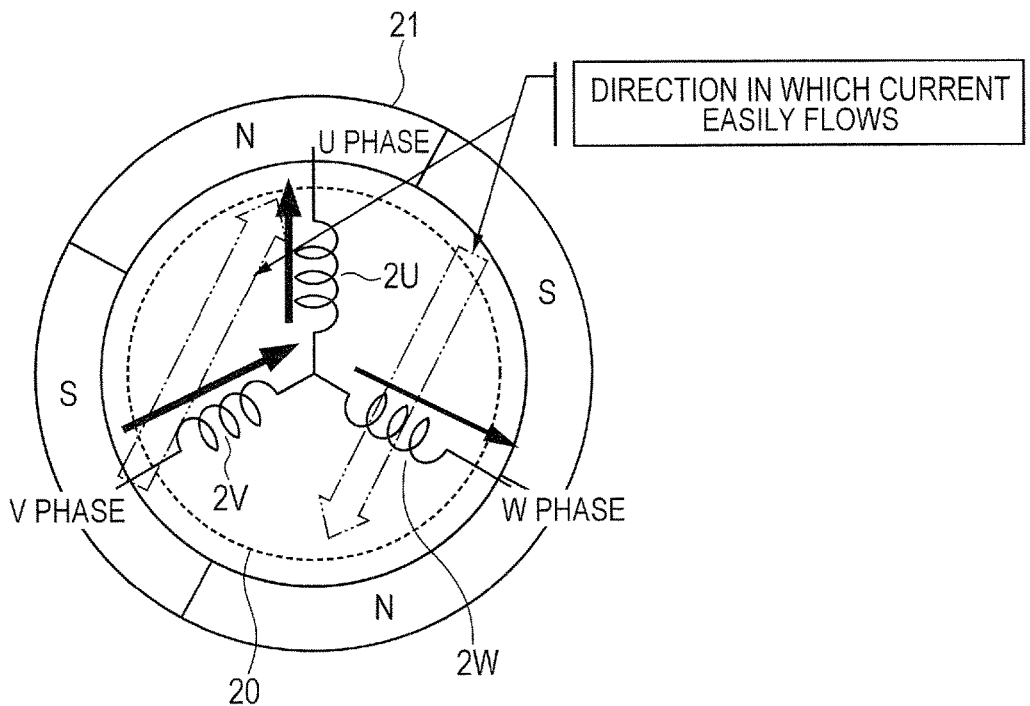
FIG. 6 is an explanatory diagram illustrating an example of the relationship between a rotor and a stator which supplies electricity to the V phase when the rotor is stopped.
Figure 7:
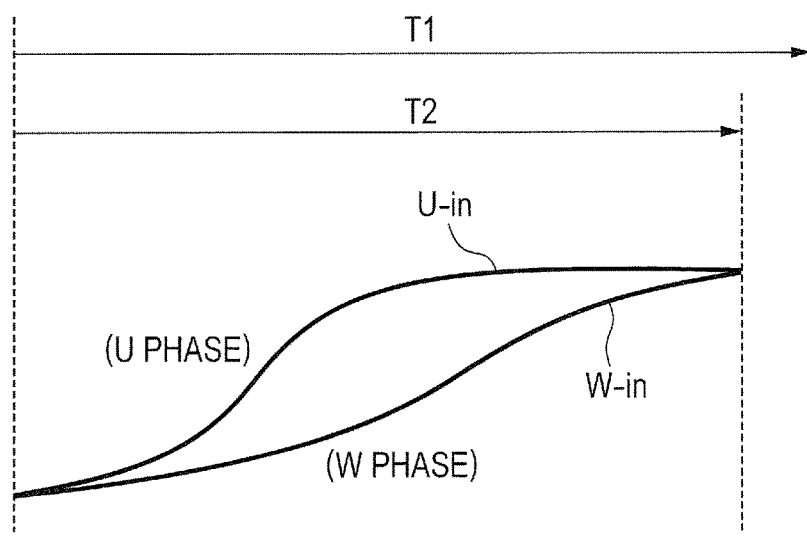
FIG. 7 is an explanatory diagram illustrating signal waveforms of the U phase and the W phase that are effected by a counter electromotive force when electricity is supplied to the V phase in FIG. 6.

Next, as exemplarily illustrated in FIG. 6, a current is supplied to the coil 2V with the V phase, and the signal U-in from the coil 2U with the U phase and the signal W-in from the 2W with the W phase are selected by the selectors 115 and 116, and then input to the comparator circuit 114. In the case, because the coil 2U with the U phase is nearest to the N pole, a current easily flows due to a small effect of the counter electromotive force. Thus, the signals U-in and W-in change as illustrated in FIG. 7, and both signal voltages match each other in a time T2 shorter than the time T1. To attain a significant high level pulse for the output of the comparator circuit 114, the selector 115 is controlled to select the signal U-in, while the selector 116 is controlled to select the signal W-in.

Figure 8:
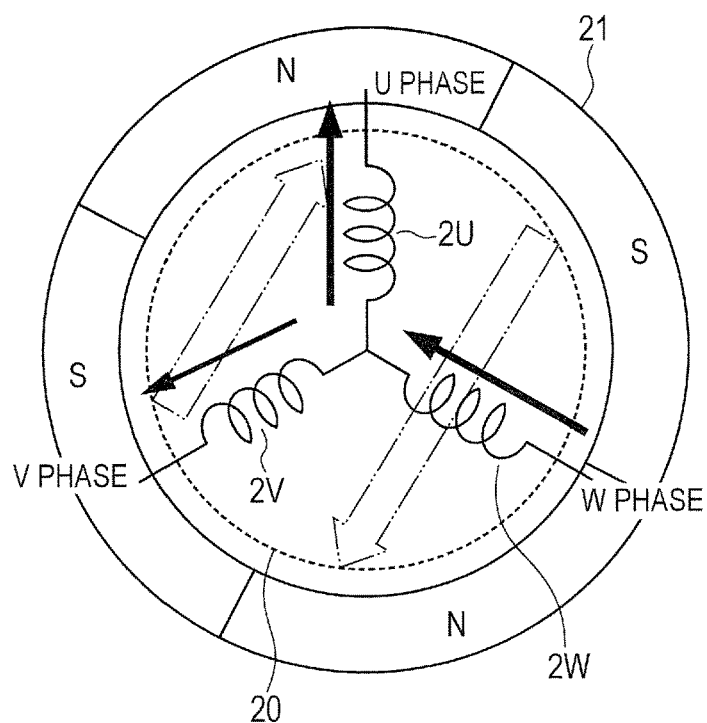
FIG. 8 is an explanatory diagram illustrating an example of the relationship between a rotor and a stator which supplies electricity to the W phase when the rotor is stopped.
Figure 9:
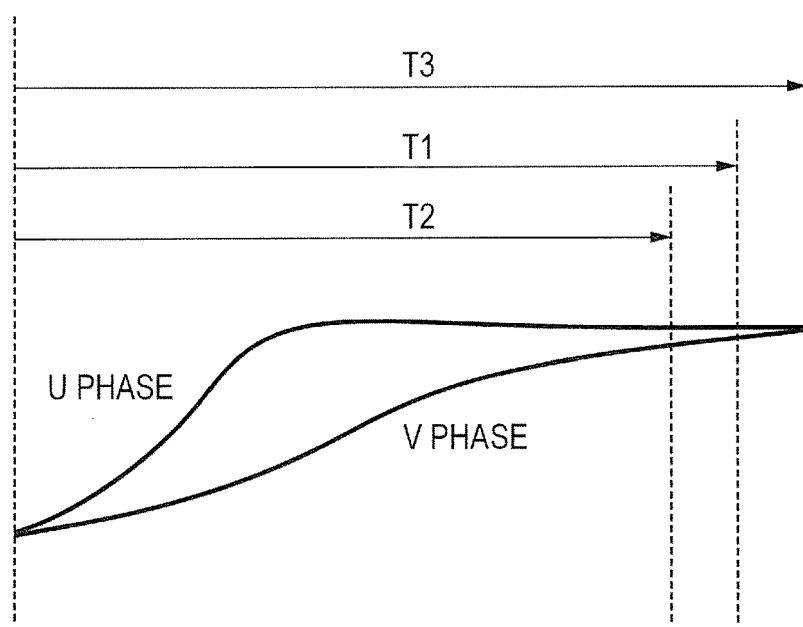
FIG. 9 is an explanatory diagram illustrating signal waveforms of the U phase and the V phase that are effected by a counter electromotive force when electricity is supplied to the W phase in FIG. 8.

Finally, as exemplarily illustrated in FIG. 8, a current is supplied to the coil 2W with the W phase, and the signal U-in from the coil 2U with the U phase and the signal V-in from the coil 2V with the V phase are selected by the selectors 115 and 116, and then input to the comparator circuit 114. In this case, because the coil 2V with the V phase is near to the S pole, a current hardly flows. Because the coil 2U with the U phase is near to the N pole, a current easily flows. Therefore, the signals U-in and V-in change as illustrated in FIG. 9, and both signal voltages match each other in a time T3 longer than the times T1 and T2. To attain a significant high level pulse for the output of the comparator circuit 114, the selector 115 is controlled to select the signal U-in, while the selector 116 is controlled to select the signal V-in.

Figure 10:
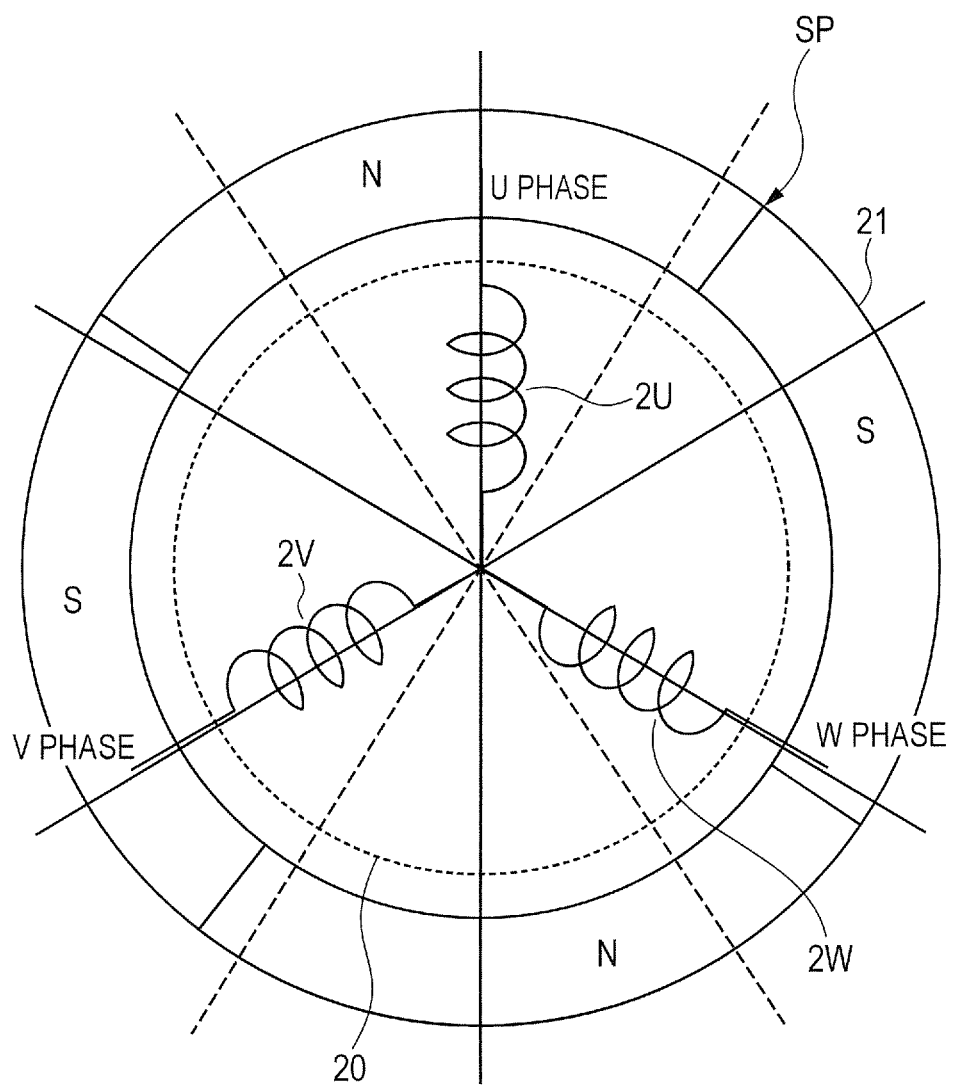
FIG. 10 is an explanatory diagram of a method for estimating a stop position of a rotor, using signals of electrically non-supplied coil phases, acquired by sequentially switching electrically supplied coil phases.

The stop position of the rotor can be estimated, based on the relationship between the above measurement times T1, T2, and T3 and their corresponding target coils to be measured. At this time, consideration is made not only to the magnitude relation of the measurement times T1, T2, and T3, but also to the time difference. As a result of this, the estimation accuracy of the stop position increases. For example, as exemplarily illustrated in FIG. 10, when the stator 20 is divided into 12 quadrants of every 30 degrees to estimate the stop position of the rotor 21, a quadrant in which the reference position of the rotor 21 enters may simply be defined in a data table in advance, in accordance with a time difference between the above measurement times T1 and T2, a time difference between T1 and T3, and a time difference between T2 and T3.

Figure 11:
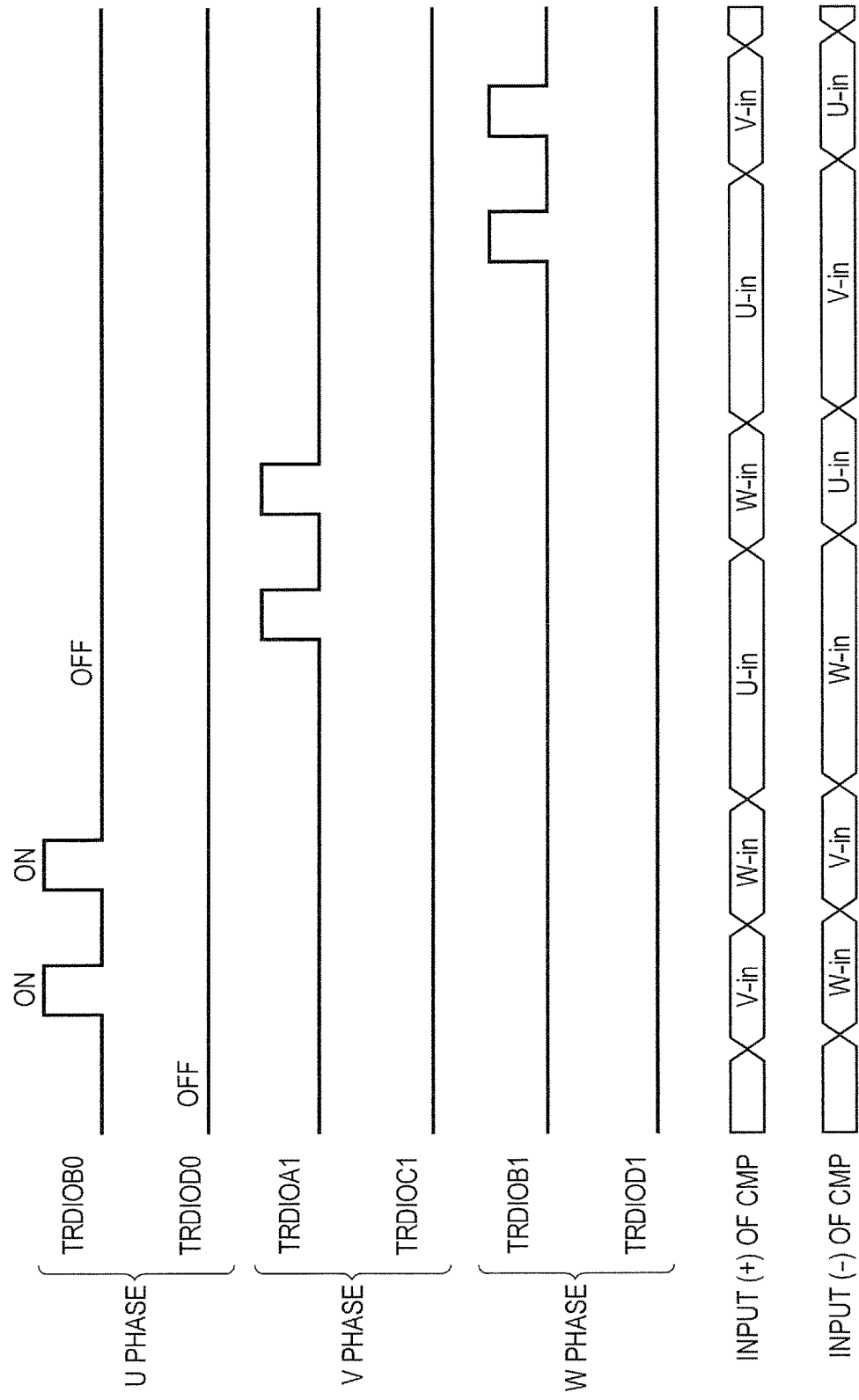
FIG. 11 is a timing diagram illustrating an example of a timing of supplying electricity to coils and a selection timing at which a selector performs inputting.

FIG. 11 illustrates examples of timings to supply a current to the coils 2U, 2V, and 2W and selection timings for inputting by the selectors 115 and 116, as explained in FIG. 4 or FIG. 9. As described above, the output of the comparator circuit 114 is assumed to be significant, when it changes from a high level to a low level at the latter circuit receiving this output. However, it is not easy to understand which signal rises first, of the signal input to the non-inverted input terminal (+) of the comparator circuit 114 and the signal input to the inverted input terminal (−). Thus, a current is supplied to the coil with the same phase for two times, and the selections of the output are switched by the selectors 115 and 116 in a manner that the inputs of the comparator circuit 114 are switched between the non-inverted input terminal (+) and the inverted input terminal (−) at each time.

Figure 12:
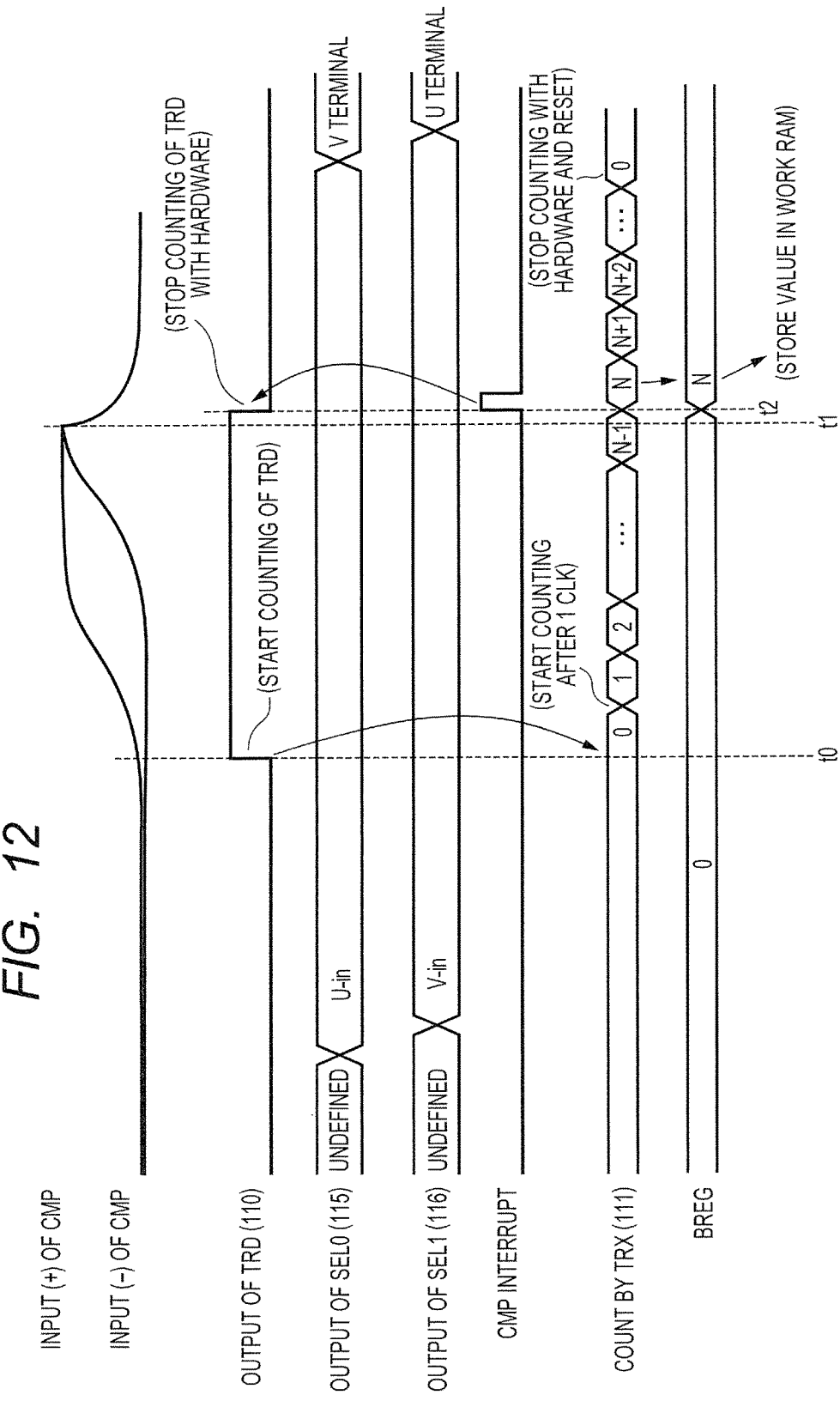
FIG. 12 is a timing diagram illustrating an example of a control timing of an operation for detecting a stop position of the rotor.

FIG. 12 exemplarily illustrates timings to control the above-described operation for detecting the stop position of the rotor 21. In this example case, the selector 115 selects the signal U-in, while the selector 116 selects the signal V-in (corresponding to the case of FIG. 8). A current is supplied to the coil 2W with the W phase since a time t0, in accordance with a PWM timer operation by the motor control timer 110 based on the setting of the CPU 100. Then, an operation is started to suppress the current supply and the current drawing to/from the rest of coils 2U and 2V. As a result, an input waveform of the comparator circuit 114 starts to change, as illustrated in FIG. 8. Upon activation of the count start signal CNTSTRT in synchronization with the time t0, the high resolution timer 111 starts a count operation at a timing, delayed by one clock of a count clock. Because both input levels of input terminals (+) and (−) of the comparator circuit 114 are the lowest level at the point of the time t0, the output of the comparator circuit 114 is not assumed to be significant at this stage. That is, the high resolution timer 111 stops the count operation for the first time, upon output of a high level pulse signal (CNTST) from the comparator circuit 114 after the count has been started. After this, if both inputs of the comparator circuit 114 are made coincident to each other at the time t1, in synchronization with this, a count stop signal CNTSTP is changed to a high level pulse at the time t2. In synchronization with this, the high resolution timer 111 stores a count value N at this time in a buffer register (BREG) 130, and a current supply operation for the coil by the motor control timer 110 is stopped. The count stop signal CNTSTP functions also as a request for interrupting the CPU 100. In response to this interrupt request, the CPU 100 stores the count value N of the buffer register 130 in the work RAM 101. After this, it initializes and stops the count operation of the high resolution timer 111, and performs necessary settings, such as timer setting or selector setting for the next operation, thereby enabling to repeat the same process described above.

Figure 13:
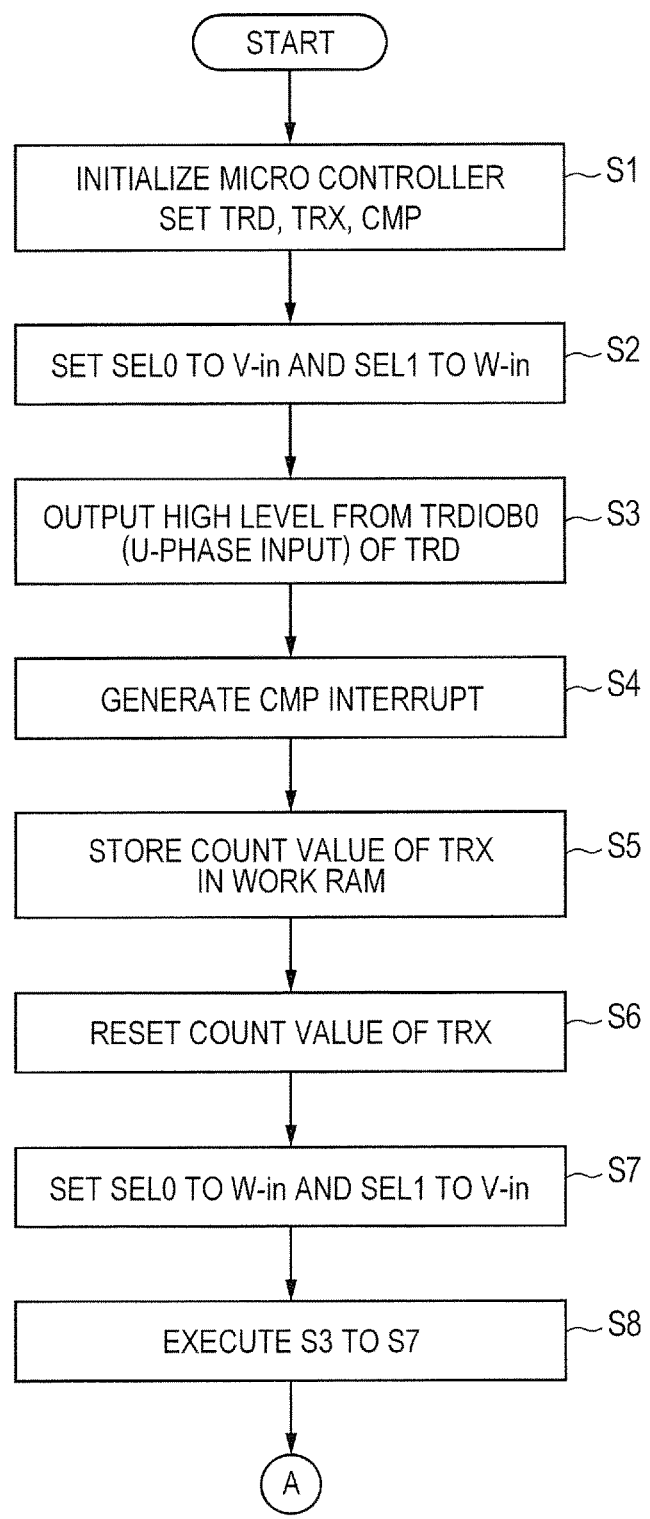
FIG. 13 is a flowchart illustrating an example of apart of a control flow of the operation for detecting a stop position of the rotor, in association with FIG. 14.
Figure 14:
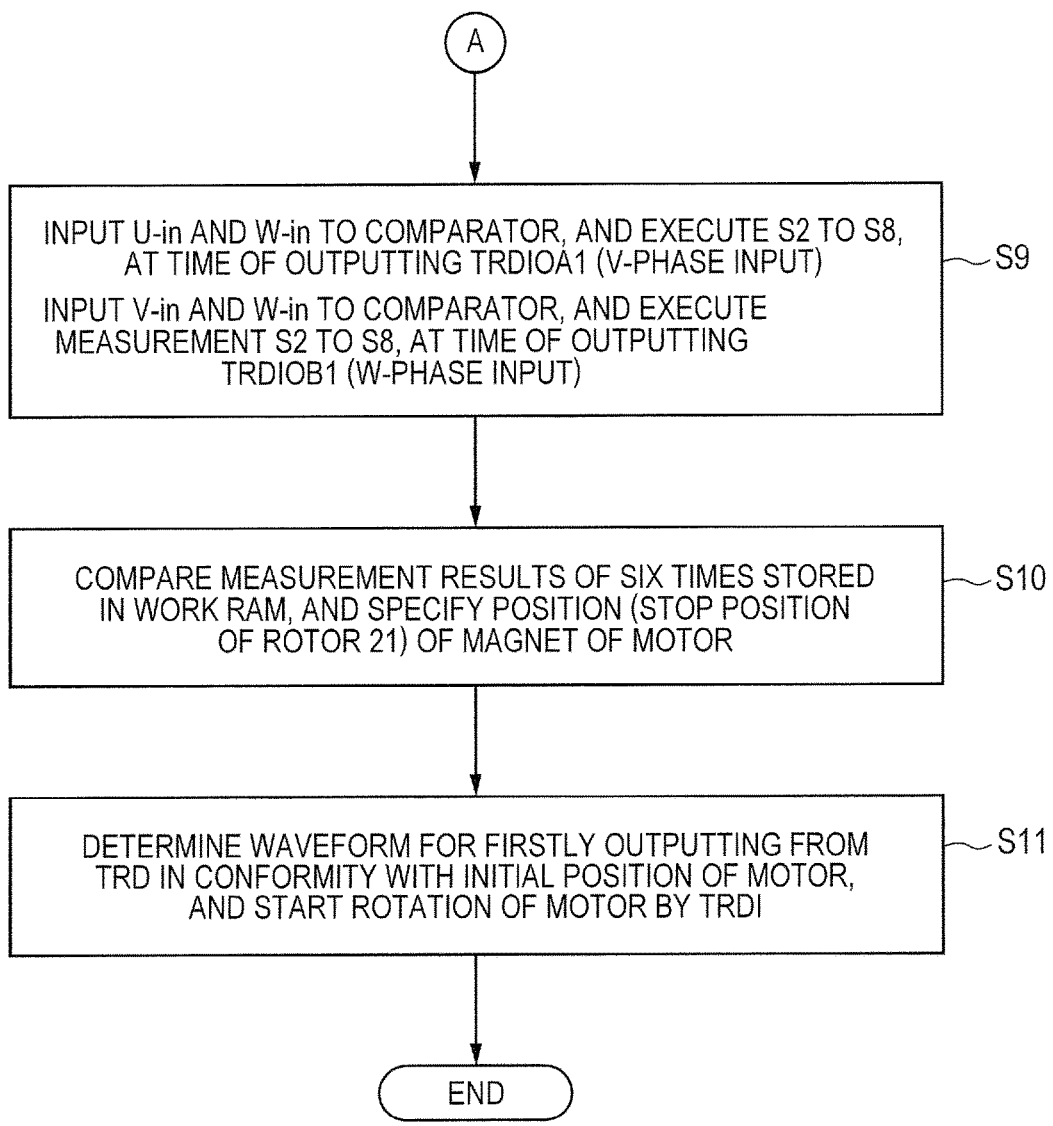
FIG. 14 is a flowchart illustrating an example of a part of the control flow of the operation for detecting a stop position of the rotor, in association with FIG. 13.

FIG. 13 and FIG. 14 exemplarily illustrate control flows of the above-described operation for detecting the stop position of the rotor 21.

Firstly, the CPU 100 controls to perform initial setting of the microcontroller 1, including the motor control timer 110, the high resolution timer 111, the comparator circuit 114 (S1). Then, it controls the selector 115 to select the signal V-in and the selector 116 to select the signal W-in (S2), controls the motor control timer 110 to output a high level signal TRDIOB0, and controls the high resolution timer 111 to start a count operation (S3). As a result, as illustrated in FIG. 5, a signal change is made in the signals V-in and W-in, and the count stop signal CNTSTP is changed into a pulse signal, when the signal level of the signal V-in is equal to or greater than the level of the signal W-in (S4). Then, the count value by the high resolution timer 111 is transferred to the buffer register 130 (S5). The value of the buffer register 130 is saved in the work RAM 101 by the interrupt process of the CPU 100, and the count value of the high resolution timer 111 is initialized (S6). Next, the selector 116 is controlled to select the signal V-in, and the selector 115 is controlled to select the signal W-in. The input of the inverted input terminal (−) of the comparator circuit 114 and the input of the non-inverted input terminal (+) thereof are switched therebetween (S7), and the above process from Steps S3 to S7 is repeated. Because it is not obvious that a faster signal change occurs in which signal of the signal V-in and the signal W-in, the inputs of the comparator circuit 114 are switched therebetween, and the same process is repeated. Therefore, either one count value will be zero.

Similarly, the operation from Step S2 to S8 is performed, by controlling the motor control timer 110 to output a high level signal TRDIOA1 and inputting the signals U-in and W-in to the comparator circuit 114. Further, the operation from S2 to S8 is performed, by controlling the motor control timer 110 to output a high level signal TRDIOB1 and inputting the signals U-in and V-in to the comparator circuit 114 (S9).

The CPU 100 determines the stop position of the rotor 21, based on the relationship between six count values stored in the work RAM in accordance with the above operation and corresponding power supply phases (S10). The CPU 100 determines a control waveform which is firstly output from the motor control timer 110 in conformity with the determined stop position of the rotor 21, and starts to rotate the rotor 21 in a predetermined direction (S11).

By the operation for detecting the stop position of the rotor at the initiation time, a change occurs in the current flowing from one electrically supplied coil with a coil phase to coils with different plurality of coil phases coupled thereto, due to an effect of an induced electromotive force by the permanent magnet of the rotor 21. This change depends on the relative position of the magnetic pole of the permanent magnet to the pair of coils. The microcontroller 1 understands the dependency of the change, thereby determining the stop position of the rotor 21 at the initiation time while the rotor 21 remains to be stopped. Thus, it is possible to avoid the reverse rotation of the rotor 21 at the initiation time, and to avoid the delay of start. Further, the selections for selecting the inputs of the comparator circuit 114 by the selectors 115 and 116 are made using signals corresponding to the currents flowing respectively to the coils of different coil phases, coupled to the electrically supplied coil. This enables to use the comparator circuit 114 for detecting the stop position of the rotor at the initiation time.

Because the high resolution timer 111 stores the count value in the buffer register 130, directly in response to a pulse change of the signal CNTSTP, an operation for keeping this count value can be executed at high speed without going through a software process, such as an interruption process. Even if the phase of the electrically supplied coil is changed, it is estimated that only a slight difference exists between coincidence timings of signals corresponding to the currents flowing respectively to the coils of different coil phases coupled to this electrically supplied coil. Thus, if it takes long time to perform a process for determining the count value to be kept, the difference acquired from the count values gets smaller, thus lowering the detection accuracy.

In the above method, divided voltage signals of the currents flowing from the electrically supplied coil of one coil phase to the two coils of different coil phases coupled thereto are input to both input terminals of comparator circuit 114, and they are compared. However, it is not limited to this method. It may be possible to perform a comparison operation, after inputting a fixed reference voltage generated by the DAC 117 to the selector 116 and controlling the selector 115 to select six kinds of divided voltage signals acquired sequentially from electrically non-supplied coils. For example, when to perform an operation corresponding to FIG. 4, a fixed reference voltage generated by the DAC 117 may be input to the selector 116, the selector 115 may be controlled to select the signal V-in and to perform a comparison operation, and its comparison result may be stored. Next, the selector 115 is controlled to select the signal W-in and to perform a comparison operation, and its comparison result may be stored. As a result, the same effect can be attained.

<High-Speed Rotation Mode>

Figure 15:
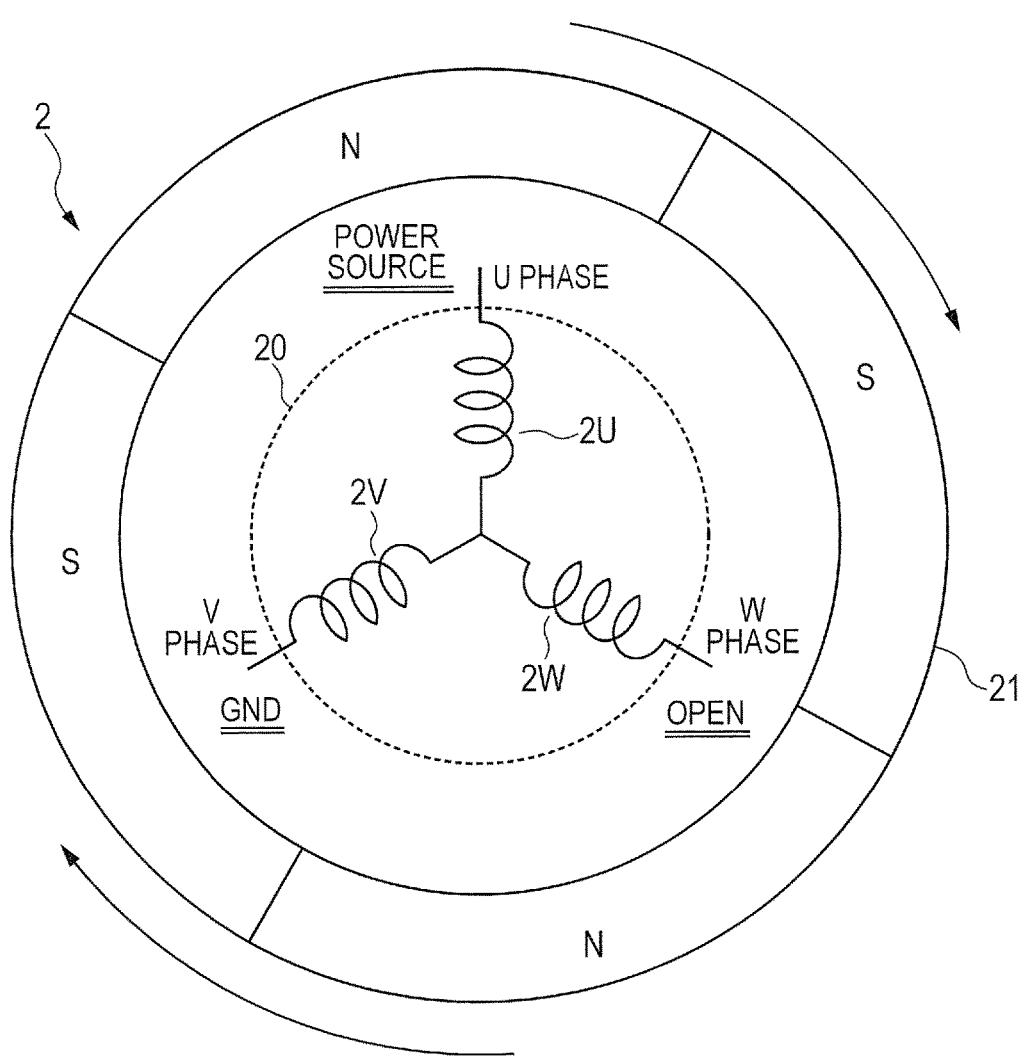
FIG. 15 is an explanatory diagram illustrating an example of an idea of "a zero cross" in a high-speed rotation mode.

When a rotation magnetic field is formed in the coils 2U, 2V, and 2W of the stator 20 for performing high speed rotation of the rotor 21, so-called electrically conductive control by 120 degrees is substantially performed for the coils 2U, 2V, and 2W. That is, when the rotor 21 is rotated by one revolution, the electrically conductive direction toward the coils 2U, 2V, and 2W is switched six times by 60 degrees each. For example, the electrically conductive direction is switched by 60 degrees, sequentially for electrical conduction from the U phase to V phase, electrical conduction from the U phase to W phase, electrical conduction from the V phase to W phase, electrical conduction from the V phase to the U phase, electrical conduction from the W phase to the U phase, and electrical conduction from the W phase to the V phase. At this time, because one electrically conductive coil exists, the rotation position of the rotor 21 is detected, based on a waveform of an induced current generated by a counter electromotive force received by the electrically non-conductive coil from the permanent magnet of the rotor 21. As exemplarily illustrated in FIG. 15, no induced current is generated, when there exists an electrically non-conductive coil (open) with the W phase at the boundary of the N pole and the S pole of the rotor 21. Thus, the signal W-in with the W phase is in a zero cross state, with respect to the reference zero level. The coils with electrically conductive phases are switched each other at a timing of rotation by 30 degrees from the zero cross position. At this time, the comparator circuit 114 is used for determining the timing of the zero cross. Though a particular restriction is not made, the comparator circuit 114 in this operation mode is set to have a function for outputting a high level pulse when an input voltage of the non-inverted input terminal (+) crosses an input voltage of the inverted input terminal (−). In this case, a reference voltage of a zero level is selected by the selector 116, and supplied to the inverted input terminal (−) of the comparator circuit 114. In addition, the signals U-in, V-in, and W-in sequentially selected by the selector 115 as signals for the electrically non-conductive coil are supplied to the non-inverted input terminal (+) of the comparator circuit 114.

Figure 16:
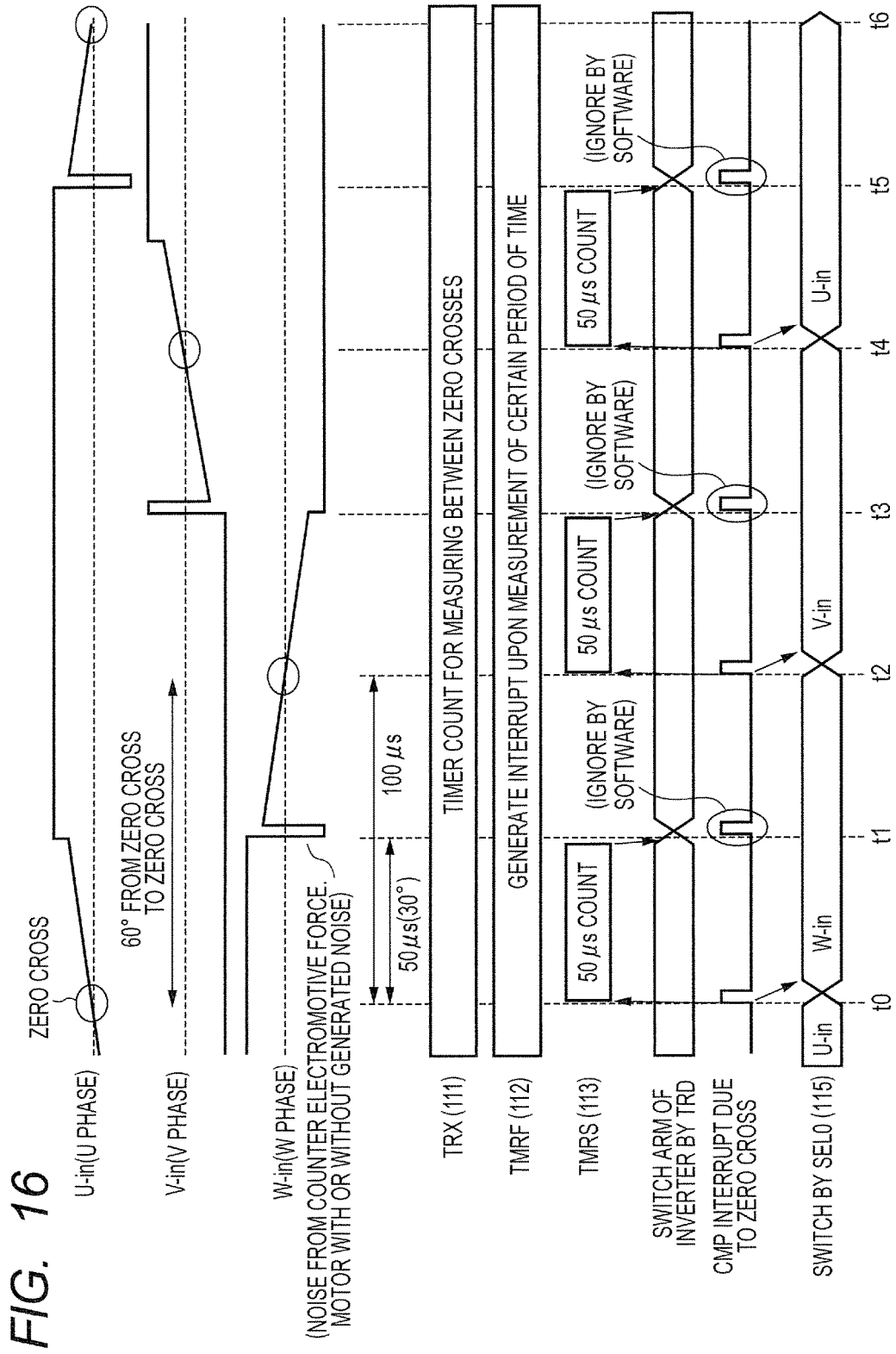
FIG. 16 is a timing diagram illustrating an example of operation timings for forming a rotation magnetic field in a high-speed rotation mode.
Figure 17:
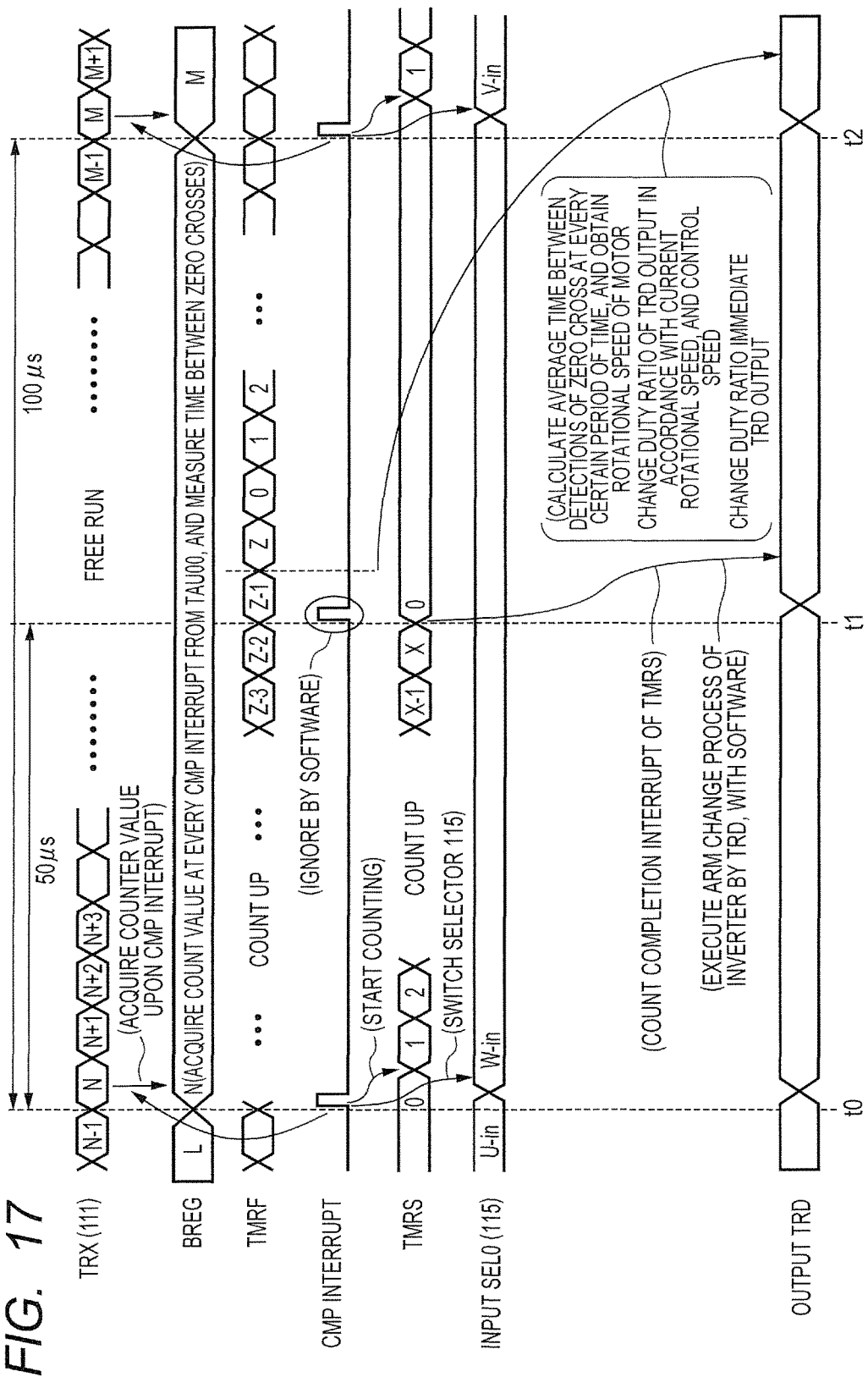
FIG. 17 is a timing diagram illustrating an example of detailed timings for a control operation between zero crosses.

FIG. 16 exemplarily illustrates timings for forming a rotation magnetic field in a high-speed rotation mode. FIG. 17 exemplarily illustrates detailed timings for a control operation between zero crosses. In this case, the rotor 21 is rotated at 100K RPM (Kilo Rotation Per Minute). Times t1, t3, and t5 correspond to timings for switching a part of electrically conductive coil phases at every rotation of 60 degrees of the rotor, while times t0, t2, and t4 correspond to a part of zero cross timings. In the rotation driving at 100K PRM, the zero cross angle of 30 degrees of the rotor corresponds to 50 µs (micro seconds). In this operation mode, the high resolution timer 111 functions as a free running counter for measuring the interval between zero cross positions. The free running count values, at the detection of the zero cross by the output of the comparator circuit 114, are sequentially kept by the work RAM 101. The timer TMRF 112 generates an interrupt request for the CPU 100 every time a count operation is performed at a predetermined time, and obtains the average of the so-far accumulated free running count values to acquire the time between the zero crosses. When the acquired time deviates from 100 µs as a target time, the clock duty of the motor control timer 110 is corrected to adjust the rotational speed of the rotor 21. When the zero cross is detected using the output of the comparator circuit 114, the timer 113 starts a count operation in synchronization with this, and issues an interrupt request for the CPU 100 at a completion timing of the counting operation for 50 µs (corresponding to the rotation angle of 30 degrees), thereby causing the motor control timer 110 to switch the electrically conductive coil phases each other. Further, the selector 115 switches input signals, when the CPU responds to the interrupt request which is output upon detection of the zero cross by the comparator circuit 114. When the motor control timer 110 switches the electrically conductive coil phases, a counter electromotive force may be generated. When this is detected and misjudged as generation of a zero cross, the CPU 100 ignores the detection result immediately right after the switching of the electrically conductive coil phases.

Figure 18:
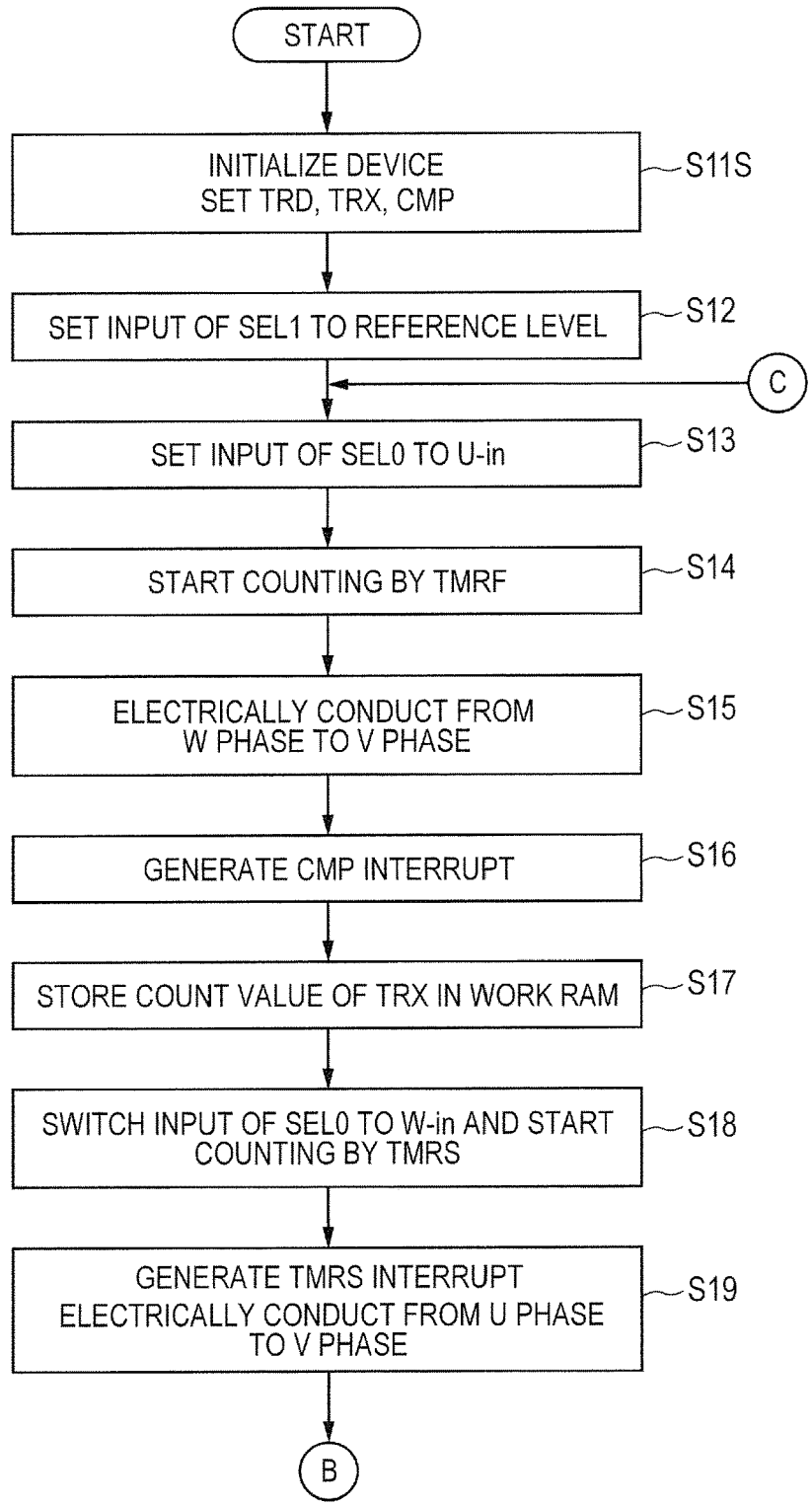
FIG. 18 is a flowchart illustrating an example of a control flow of a high-speed rotation mode of the rotor, in association with FIG. 19.
Figure 19:
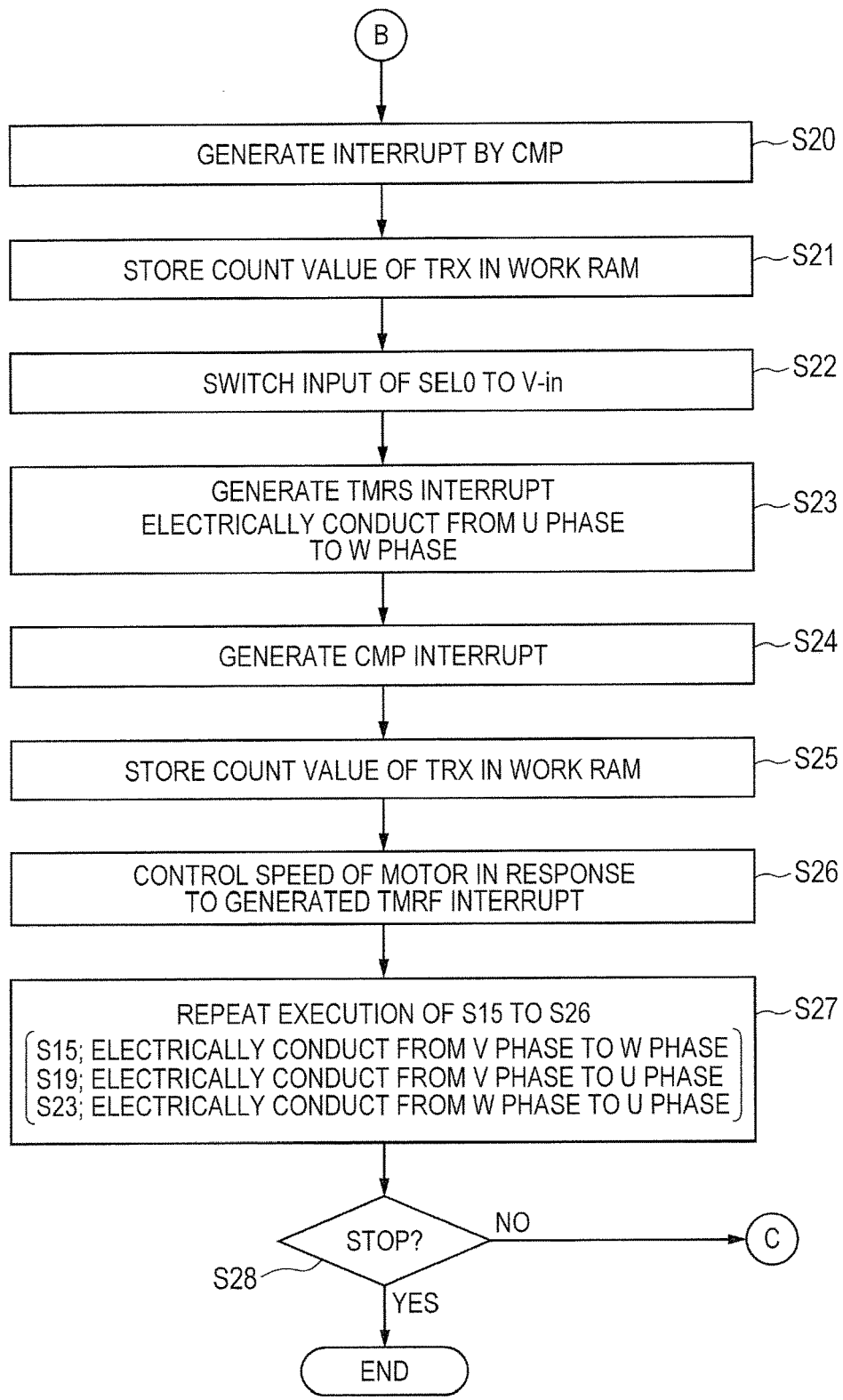
FIG. 19 is a flowchart illustrating an example of the control flow of a high-speed rotation mode of the rotor, in association with FIG. 18.

FIG. 18 and FIG. 19 exemplarily illustrate control flows of high-speed rotation modes of the motor 21.

Firstly, the CPU 100 controls to perform initial setting of the microcontroller 1, including the motor control timer 110, the high resolution timer 111, and the comparator circuit 114 (S11S). The high resolution timer 111 is controlled to execute a free running count operation. Next, the selector 116 is controlled to select a reference level for determining the zero cross (S12), while the selector 115 is controlled to select the signal U-in (S13). The timer TMRF 112 is controlled to start a count operation (S14). The motor control timer 110 is controlled to output high level signals TRDIOB1 and TRDIOC1, and a current flows from the coil 2W with the W phase to the coil 2V with the V phase (S15). Upon detection of a zero cross by the comparator circuit 114, a CMP interrupt corresponding to this is generated (S16). In response to this interrupt request, the CPU 100 stores the free running count values of the high resolution timer 111 in the work RAM 101 (S17), switches the input of the selector 115 to the signal W-in with the W phase, and starts a count operation of the timer 113 (S18).

When the timer 113 ends a count operation for 50 µs and outputs an interrupt request, the CPU 100 switches, in response to this, the electrically conductive coil phases, in response to this, to cause a current to flow from the coil 2U with the U phase to the coil 2V with the V phase (S19). Upon detection of a zero cross by the comparator circuit 114, a CMP interrupt corresponding to this is generated (S20). In this response to this interrupt request, the CPU 100 stores the free running count values of the high resolution timer 111 in the work RAM 101 (S21), switches the input of the selector 115 to the signal V-in with the V phase, and starts a count operation of the timer 113 (S22). Upon detection of a zero cross by the comparator circuit 114, a CMP interrupt corresponding to this is generated (S24). In response to this interrupt request, the CPU 100 stores the free running count values of the high resolution timer 111 in the work RAM 101 (S25). After this, if the interrupt is generated by counting-up of the timer 112, the CPU 100 obtains the average of count values, stored in the work RAM 101 and obtained by the high resolution timer 111, and calculates the rotational speed of the rotor 21. When the calculated rotational speed deviates from a target speed, duty control is performed for the motor driving control signal output by the motor control timer 110 to control the rotational speed of the rotor 21 to be the target speed (S26).

Further, the above steps S15 to S26 are repeated. At this time, the electrical conduction in Step S15 is replaced by electrical conduction from the V phase to the W phase, the electrical conduction in Step S19 is made from the V phase to the W phase, and the electrical conduction in Step S23 is made from the W phase to the U phase.

Accordingly, the driving control of one rotation is performed for the rotor 21. The above process is repeated until detection of an instruction for stopping the rotation in Step S28, thereby controlling the high-speed rotation driving of the motor. Though a particular restriction is not made, the motor 2 is stopped upon determination as to whether the time between zero cross points is equal to or greater than a predetermined time.

In the driving control in the above-described high-speed rotation mode, adopted selectors are the selectors 115 and 116 that can arbitrarily select the input of the inverted input terminal (−) and the input of the non-inverted input terminal (+) of the comparator circuit 114, from the signals U-in, V-in, and w-in, and a reference signal. Thus, the same comparator circuit 114 can be used for both of the detection of the rotation stop position of the rotor 21 and the control of the high-speed rotation of the rotor 21. In other words, it is possible to detect the position of the rotor 21 with respect to the permanent magnet of the stator 20, both at the time of rotation stoppage of the rotor and at the time of high-speed rotation of the rotor in accordance with electrical conduction control by 120 degrees, using one comparator circuit 114. By using the hardware-coupled timer (high resolution timer) 111 which measures and detects the position with high accuracy, in other words, because the count values obtained by the high resolution timer 111 are kept to be used, upon activation of the count stop signal CNTSTP, the position detection can be achieved with high accuracy, and the rotation of the motor 2 can be controlled sensitively.

<Low-Speed Rotation Mode>

The high-speed rotation in the above-described high-speed rotation mode implies the rotation speed that causes a gradual change in the signal of the electrically non-conductive coil of the stator 20, due to an effect of a counter electromotive force by a magnetic field from the permanent magnet of the rotor 21. Thus, when the comparator circuit 114 cannot detect the effect of the counter electromotive force, that is, when the rotor 21 is at the transient stage until the high speed rotation, or when the rotor 21 is actively rotated at low speed, there is adopted a process (low speed circuit mode), using an ADC 119 (instead of the comparator circuit 114), for detecting the position of the rotor under the electrical conduction control by 120 degrees. In principle, in the low speed rotation mode, a determination is made, as a zero cross point, on the timing at which a signal corresponding to the current flowing to an electrically non-conductive coil crosses an average value of the sum of a signal corresponding to a current flowing to an electrically conductive coil when electricity is conducted from a coil with one coil phase of a plurality of coil phases to the corresponding coil with another coil phase and a signal corresponding to a current flowing to the electrically non-conductive coil due to an effect of the magnetic flux of the rotor. In synchronization with this timing, the switching is performed between the electrically conductive coil phases, thereby controlling low-speed rotation driving of the rotor.

Figure 20:
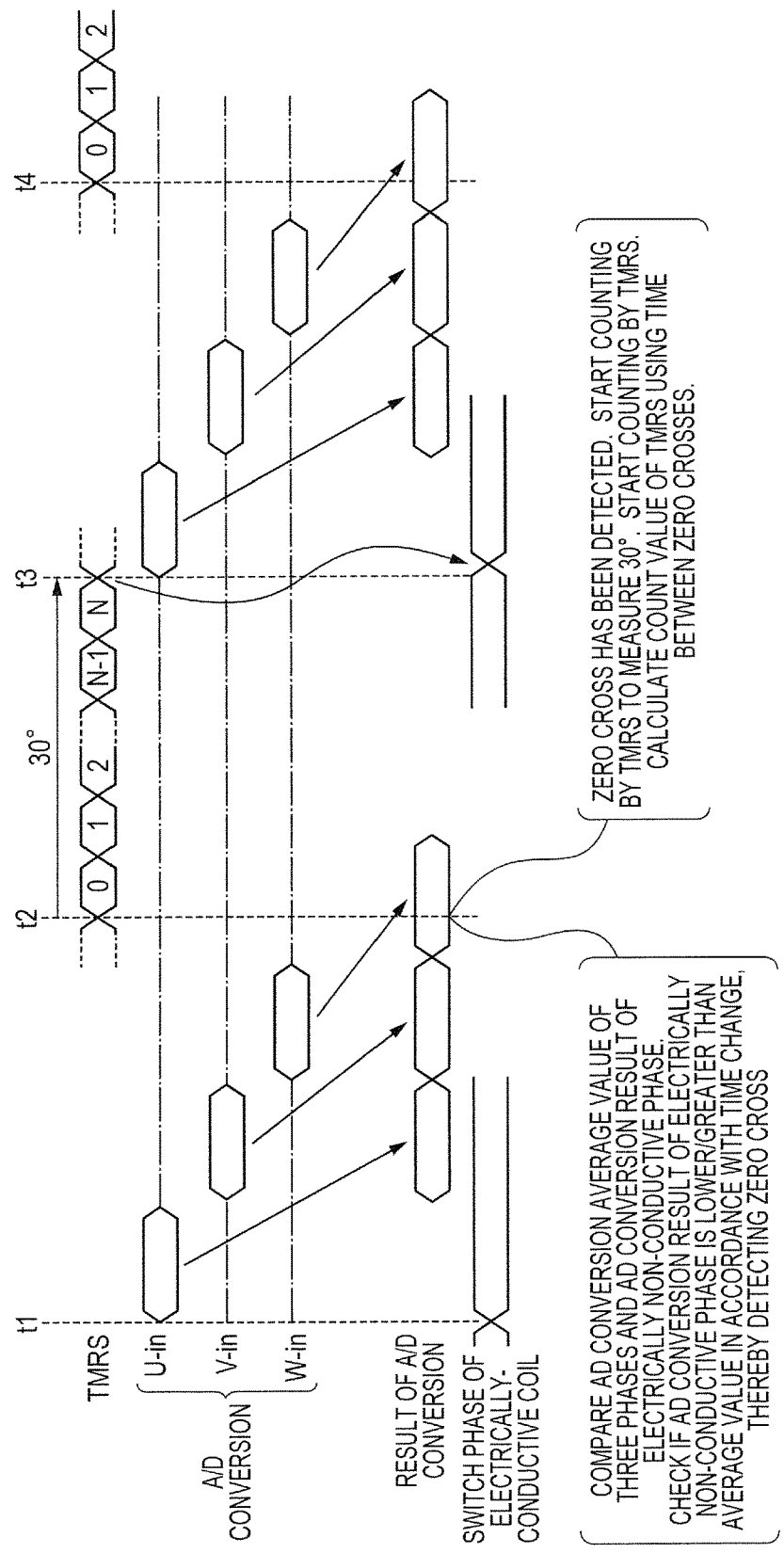
FIG. 20 is a timing diagram illustrating an example of schematic operational timings for forming a rotation magnetic field in a low-speed rotation mode.
Figure 21:
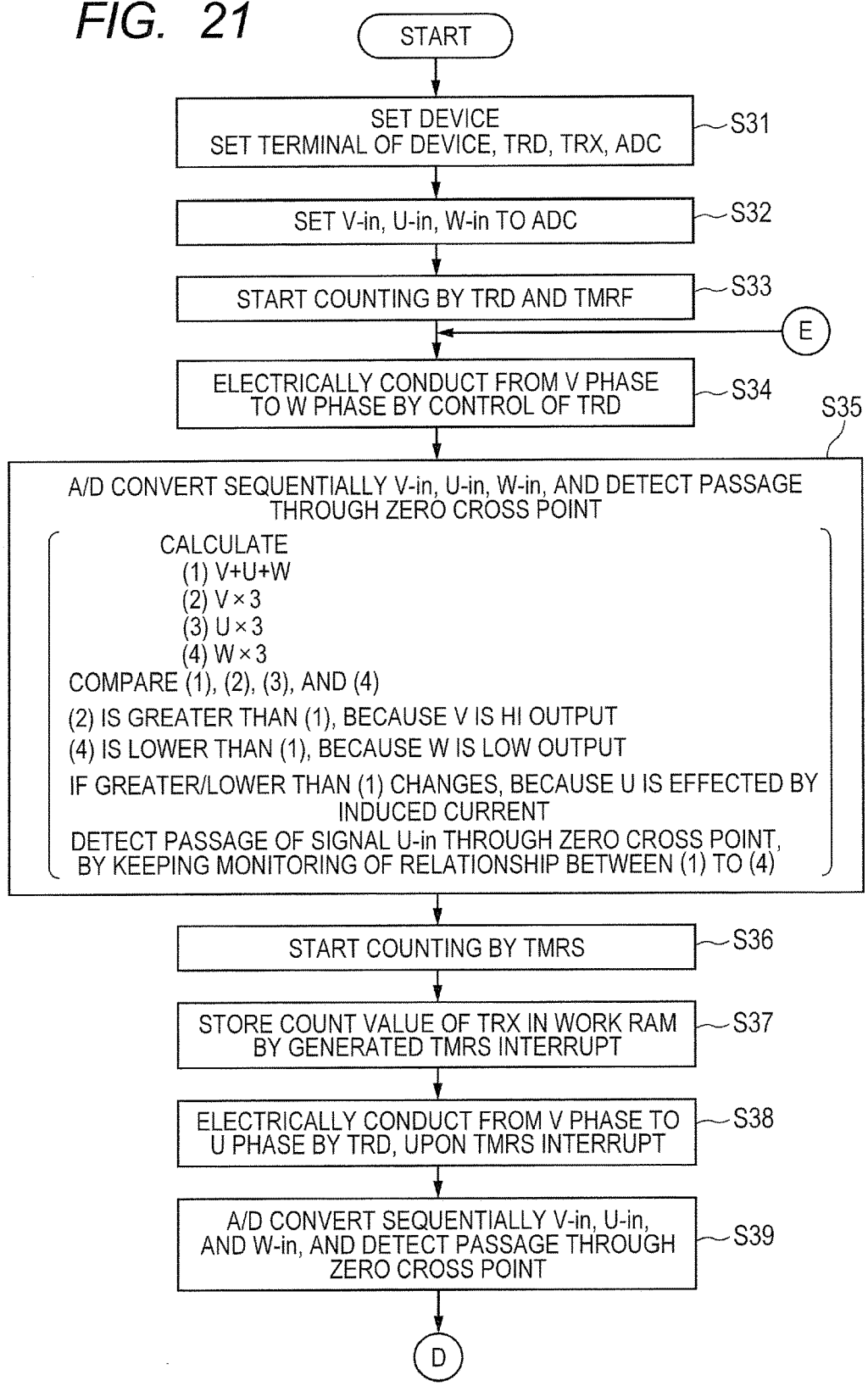
FIG. 21 is a flowchart illustrating an example of a control flow of the low-speed rotation mode of a rotor, in association with FIG. 22.
Figure 22:
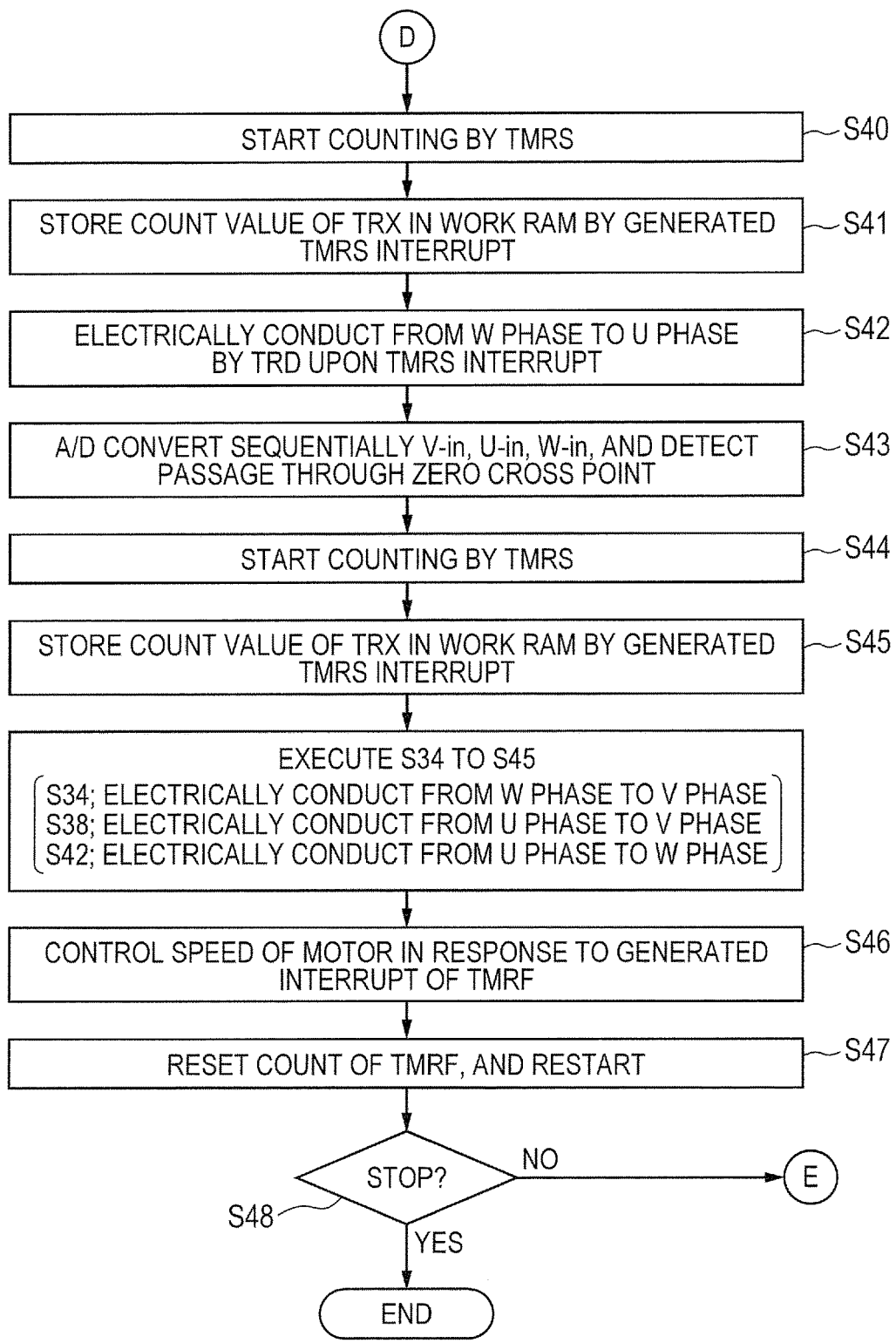
FIG. 22 is a flowchart illustrating an example of the control flow of the low-speed rotation mode of the rotor, in association with FIG. 21.

FIG. 20 exemplarily illustrates schematic operational timings for forming a rotation magnetic field in a low-speed rotation mode. In FIG. 20, representatively illustrated times t1 and t3 are timings for switching electrically conductive coils by the motor control timer 110. In addition, representatively illustrated times t2 and t4 represent estimated zero cross points. For example, signals U-in, V-in, and W-in obtained by the electrical conduction from the V phase to the U phase at the time 1 are sequentially A/D converted by the ADC 119, to obtain the conversion results. For the A/D conversion results corresponding to the three phases, the CPU 100 successively determines whether the A/D conversion value of the signal W-in of the electrically non-conductive phase at this time crosses the average value. The crossing point is estimated as a zero cross point, and the time t2 is the estimated time of the zero cross point. In synchronization with this time t2, the timer (TMRS) 113 starts a count operation. When its count value corresponds (time t3) to the rotation angle of 30 degrees of the rotor 21, the motor control timer 110 switches the electrically conductive coils in response to it. FIG. 21 and FIG. 22 exemplarily illustrate control flows of the low-speed rotation mode of the rotor 21.

Firstly, the CPU 100 controls to perform initial setting of the microcontroller 1, including the motor control timer 110, the high resolution timer 111, and the comparator circuit 114 (S31). The high resolution timer 111 executes a free running count operation. Next, the inputs of the ADC 119 are set to U-in, V-in, W-in (S32), the timer (TRMF) 112 is controlled to start a count operation (S33), and a current is controlled to flow from the coil 2V with the V phase to the coil 2W with the W phase using the motor control timer 110 (S34). The ADC 119 sequentially A/D converts the signals V-in and W-in obtained from the electrically conductive coils 2V and 2W and the signal U-in obtained from the electrically non-conductive coil 2U, and the CPU 100 detects the passage through the zero cross point, using the conversion results (S35). That is, some calculations are made to obtain: (1) the sum of A/D converted values of the signals V-in, W-in, and U-in; (2) three times the A/D converted value of the signal V-in; (3) three times the A/D converted value of the signal U-in; and (4) three times the A/D converted value of the signal W-in. A determination is made as to whether either one value of (2), (3), and (4) crosses the value of (1). This is equivalent to the determination as to whether the A/D converted value of the signal with the electrically non-conductive phase at that time crosses the average value of the A/D converted values corresponding to the three phases. The signal with the electrically non-conductive phase changes every second in accordance with the position of the rotor 21 due to an effect of an induced electromotive force. Thus, the above determination needs to be done one by one.

Upon determination of the crossing, the timer (TRMS) 113 starts counting (S36). When it reaches the count value corresponding to the rotation by 30 degrees of the rotor 21, an interrupt request is given to the CPU 100. Then, the count value of the high resolution timer 111 is stored in the work RAM 101 (S37), and electrical conduction is made from the V phase to the U phase by the CPU 100 (S38). After this, it determines the zero cross point with respect to the signal W-in with the electrically non-conductive phase W in accordance with the same technique as that in S35, with respect to the corresponding electrically conductive phases (S39). The count value corresponding to the rotation by 30 degrees of the rotor 21 is unambiguously determined based on the rotation speed of the rotor, and may be determined using, for example, the rotation speed of the rotor 21 calculated in Step S46.

Upon detection of the passage through the zero cross point in Step S39, the timer (TRMS) 113 starts counting (S40). When it reaches a count value corresponding to the rotation by 30 degrees of the rotor 21, an interrupt request is given to the CPU 100, and it stores the count value of the high resolution timer 111 (S41). Electrical conduction is made from the W phase to the U phase by the CPU 100 (S42). After this, a determination is made for the zero cross point with respect to the signal V-in with the electrically non-conductive phase in accordance with the same technique as that in S35, in the relationship with this corresponding electrically conductive phase (S43).

Upon detection of the passage through the zero cross point in S43, the timer (TRMS) 113 starts counting (S44). When it reaches the count value corresponding to the rotation by 30 degrees of the rotor 21, an interrupt request is given to the CPU 100, and it stores the count value of the high resolution timer 111 in the work RAM 101 (S45). Further, the process from Step S34 to Step S45 is repeated. At this time, the electrical conduction in Step S34 is replaced with electrical conduction from the W phase to the V phase, the electrical conduction in Step S38 is replaced with electrical conduction from the U phase to the V phase, and the electrical conduction in Step S42 is replaced with electrical conduction from the U phase to the W phase.

Finally, when an interrupt is generated by counting-up of the timer 112, the CPU 100 obtains the average of the count values, stored in the work RAM 101 and obtained by the high resolution timer 111, and calculates the rotation speed of the rotor 21. When the calculated speed deviates from the target speed, duty control is performed for the motor driving control signal pulse output by the motor control timer 110 to control the rotation speed of the rotor 21 to be the target speed (S46). Then, the count of the timer 112 is reset, and a count operation is restarted (S47).

Accordingly, the low-speed driving control of one rotation is performed for the rotor 21. Until detection of an instruction for stopping the rotation in Step S48, the above process is repeated, thereby controlling the high-speed rotation driving of the motor. Though a particular restriction is not made, the motor 2 is stopped when the time between zero cross points is equal to or greater than a predetermined time.

The driving control in the above-described low-speed rotation mode has been performed. The current flowing to the coil with the electrically non-conductive phase is hardly effected by the magnetic flux of the rotor 21 in the low-speed circuit of the rotor 21, taking into consideration of a matter that it is difficult to detect the difference, even if it is compared to the reference signal like the high-speed rotation control. As described in Step S35, the change speed of the current flowing to the coil with electrically non-conductive phase is greater than the change speed of the average value of the sum. Thus, it is possible to estimate the zero cross point of the change in a current flowing to the coil with the electrically non-conductive phase due to the effect of the magnetic flux of the rotor, based on the timing at which the changes cross each other. This process can simply be realized by an arithmetic process using the software, of the CPU 100. Specifically, in this process, obtained is the average value of the sum of the digital data obtained by A/D converting the signals U-in, V-in, and W-in, and the magnitude relation is determined.

<Electric Drill>

Figure 23:
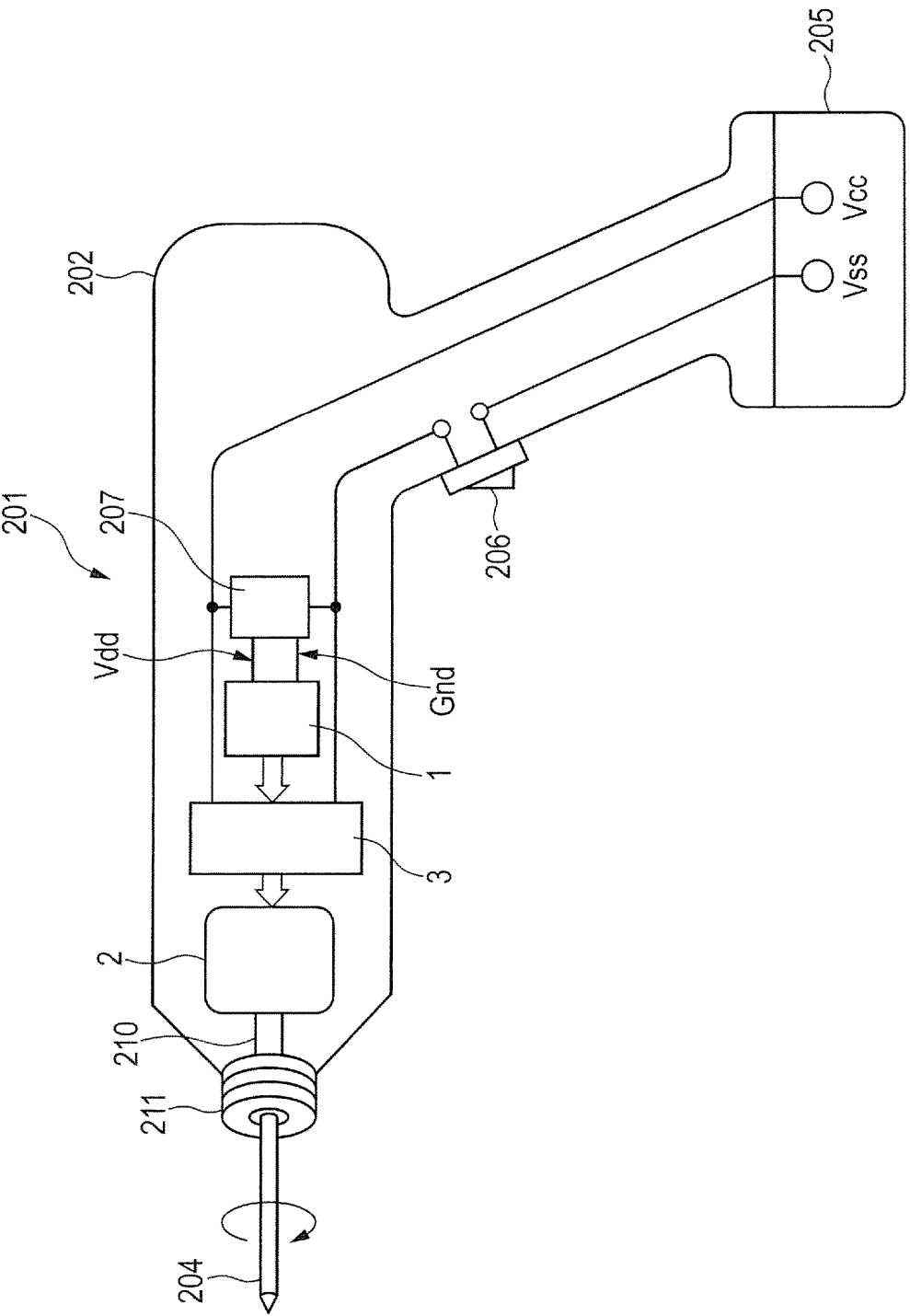
FIG. 23 is a schematic block diagram illustrating an electric drill as an example of an electrically-powered equipment using a microcontroller.

FIG. 23 illustrates an electric drill as an example of an electrically-powered equipment using the above-described microcontroller 1. Though a particular restriction is not made, an electric drill 201 has a battery 205 as an operation power source. In addition, a case 202 includes a motor 2, an inverter 3, a microcontroller 1, and a power supply circuit 207. The power supply circuit 207 receives an operation power source from the battery 205, and gives a power supply voltage vdd of the microcontroller 1 and a ground voltage Gnd. The inverter 3 drives coils 2U, 2V, and 2W using the operation power source of the battery 205. The rotation of the rotor 21 of the motor 2 reaches a drill spindle 210, and a drill 204 as a cutting edge is attachable/detachable to/from the drill spindle 210 through a drill chuck 211. The supply/interception of the power source is performed by a power switch 206. When power is applied by the power switch 206, the microcontroller 1 is initialized, and the stop position of the rotor with respect to the stator is determined in the rotor stop position detection mode at the initiation time under the control of the CPU 100. In accordance with its result, the rotor starts to be rotated in the low-speed rotation mode in a predetermined direction. When it reaches a predetermined rotation speed, the rotor 21 is rotated at high speed in the high-speed rotation mode. Though not illustrated, needless to say, a speed adjustment switch may be provided.

The stop position of the rotor 21 of the stator 20 can be determined by this electric drill 201. Thus, it is possible to prevent reverse rotation of the rotor 21 at the initiation time of the rotor 21, and to avoid the delay of the initiation. Therefore, it is possible to avoid a bad effect onto cutting blades of the drill 204 by the reverse rotation of the rotor 21, and to start the operation by the drill 204 immediately after the activation of the rotor 21, thereby contributing the improvement of the operability by the electric drill.

Accordingly, the embodiment of the present invention attained by the present inventors has specifically been described. However, the present invention is not limited to this, and various changes may possibly be made without departing from the scope thereof.

For example, in the above embodiment, no descriptions have been made to the forced shutdown of the driving pulse upon detection of an excess current. However, this method is a well-known technique, and the function may easily and appropriately be adopted into the microcontroller 1.

In the above embodiment, the comparison function of the comparator circuit 114 is changed between the rotor stop position detection mode and the high-speed rotation mode, but it is not limited to this. When one input level is equal to or exceeds the other input level, if it is has a function for outputting an enable pulse or an edge signal whose level is changed to a predetermined direction, the comparison function does not need to be changed between both operational modes.

In the control method at the time of the low-speed rotation, when the value of the middle point of the zero crosses is known (or when there is an assumed particular value), there is no need to acquire values of A/D converted signals of all three U-in, V-in, and W-in. Only the signals (signals of electrically non-conductive coils) with a generated induced current need to be targets to be monitored.

Even when to adopt the 180-degree control (control a drive voltage for the coil in a sine wave shape) in the rotation driving control of the motor, it is possible to adopt the stop position determination technique for the rotor. In this case, it is not possible to use the same circuits, such as the comparator circuits and the selectors, for the rotation driving control of the motor and the stop position determination control of the rotor.

The electrically-powered equipment is not limited to the electric drill, and it may be applied to the electric tools, such as an electric saw. It is not limited to the electric tools, and may widely be applied to any home appliances or electrical apparatuses using a brushless DC motor.

It is not limited that the brushless DC motor, described in the above embodiment, as a target to be controlled has a configuration of 4 poles, 3 phases, and 3 slots. Needless to say, it is possible to set a target having an appropriate number of poles, phases, and slots, for example, 2 poles, 3 phases, and 3 slots, or 4 poles, 3 phases, and 6 slots.

What is claimed is:

1. A semiconductor device which selectively supplies currents to coils with a plurality of coil phases of a brushless DC (Direct Current) motor including a rotor having a permanent magnet with a plurality of poles and a stator having the coils with the coil phases, and controls rotation driving of the rotor,
   wherein, when electricity is supplied sequentially to the coil with one coil phase, detection is made on a difference of signals corresponding to currents flowing respectively to coils with other plurality of coil phases, coupled to the electrically supplied coil phase, due to an effect of a magnetic flux of a stopped rotor, thereby determining a stop position of the rotor with respect to the stator, based on relationship between a detection result and a coil phase in association with each other, and
   wherein an electrically conductive phase of the coil is determined based on the result of the detection result, to start to rotate the rotor in a predetermined direction.

2. The semiconductor device according to claim 1,
   wherein, when electricity is conducted from the coil with one coil phase of the coupled coil phases to a coil with another coil phase, switching of the electrically conductive coil phase is performed, based on a timing at which a signal corresponding to a current flowing to a coil of an electrically non-conductive phase due to an effect of a magnetic flux of the rotor reaches a reference signal, and
   wherein high-speed rotation driving of the rotor is controlled.

3. The semiconductor device according to claim 2,
   wherein, when electricity is conducted from the coil with one coil phase of the coupled coil phases to a coil with another coil phase, switching of the electrically conductive coil phase is performed, in synchronization with a timing at which there is reversal of a magnitude relation between a signal corresponding to a current flowing to the coil with the electrically non-conductive phase and an average value of the signal corresponding to the current flowing to the coil with the electrically conductive phase and a signal corresponding to the current flowing to the coil with the electrically non-conductive phase due to the effect of the magnetic flux of the rotor, and
   wherein low-speed rotation driving of the rotor is controlled,
   the semiconductor device comprises a selector, circuit that selects signals corresponding to currents flowing respectively to the coils with the coupled coil phases, for controlling determining the stop position of the rotor with respect to the stator.

4. The semiconductor device according to claim 3, comprising:
   a comparator circuit which compares two signals selected by the selector circuit; and
   a timer counter which acquires a count value corresponding to a coincidence detection timing by the comparator circuit, and
   wherein the comparator circuit forms a coincidence timing of the signals selected by the comparator circuit,
   wherein the timer counter acquires a count value since a counting operation starts in synchronization with a timing of supplying electricity to the coil with one coil phase until the coincidence timing, and
   wherein the stop position of the rotor with respect to the stator is determined based on relationship between the acquired count value and the plurality of coil phases in association with each other.

5. The semiconductor device according to claim 4,
   wherein the timer counter has a buffer register keeping the count value until the coincidence timing in response to the coincidence.

6. The semiconductor device according to claim 4,
   wherein the selector circuit selects the reference signal and the signal corresponding the current flowing to the coil with the electrically non-conductive phase due to the effect of the magnetic flux of the rotor, for controlling the high-speed rotation driving of the rotor,
   wherein the comparator circuit forms a coincidence timing of signals selected by the selector circuit, and
   wherein the electrical conductive coil phase is controlled to be switched in synchronization with the coincidence timing acquired by the comparator circuit.

7. The semiconductor device according to claim 4, comprising an A/D (Analog/Digital) converter circuit,
   wherein, when electricity is conducted from a coil with one of the plurality of coupled coil phases to a coil with another coil phase, the A/D converter converts a signal corresponding to a current flowing to the coil with the electrically conductive phase and a signal corresponding to a current flowing to the coil with the electrically non-conductive phase due to the effect of the magnetic flux of the rotor, for controlling the low-speed rotation driving of the rotor, and
   wherein there is obtained a timing at which there is reversal of the magnitude relation using conversion obtained digital signals.

8. An electrically-powered equipment comprising:
   a brushless DC (Direct Current) motor which includes a rotor having a permanent magnet with a plurality of poles and a stator having coils of a plurality of coil phases;
   a semiconductor device which selectively supplies currents to the coil phases of the brushless DC motor, and controls rotation driving of the rotor; and
   an operative mechanism which operates the brushless DC motor as a power source, and
   wherein, when electricity is supplied sequentially to a coil with one coil phase, the semiconductor device detects a difference of signals corresponding to currents flowing respectively to coils with other plurality of coil phases coupled to the electrically supplied coil phase due to an effect of a magnetic flux of a stopped rotor, thereby determining a stop position of the rotor with respect to the stator, based on relationship between a detection result and the coil phase in association with each other, wherein an electrically conductive phase of a coil is determined in accordance with the determination result, to start to rotate the rotor in a predetermined direction, and wherein the stop position of the rotor with respect to the stator is determined based on a relationship between an acquired count value and the plurality of coil phases in association with each other.

9. A semiconductor device which controls driving of a brushless DC (Direct Current) motor including a rotor having a permanent magnet with a plurality of poles and a stator having coils with a plurality of coil phases, comprising:

a pulse generation circuit which generates a pulse control signal for selectively supplying currents to the coils with the coil phases of the brushless DC motor;

a selector circuit which selects arbitrary two signals, from detection signals corresponding to currents flowing respectively to the coils and a reference signal;

a comparator circuit which compares the two signals selected by the selector circuit;

a timer counter; and a control circuit, wherein the control circuit repeatedly controls an operation for the pulse generation circuit to output a pulse control signal for supplying electricity to one of the coil phases in a state where the rotor is stopped, an operation for the selector circuit to select a detection signal corresponding to a current flowing from the electrically supplied coil to two coils with other coil phases coupled thereto, from the detection signals, and an operation for the timer counter to measure a time until determination of a state in which the selected two detection signals coincide with each other based on an output of the comparator circuit, while sequentially switching the electrically supplied coil phases, thereby determining a stop position of the rotor with respect to the stator, based on relationship between a result of measurement operation by the timer counter and the coil phases in association with each other, and wherein the control circuit controls the pulse generation circuit to output a pulse control signal for electrically conducting from a coil with one of the coil phases to a coil with another coil phase.

10. The semiconductor device according to claim 9, wherein the timer counter starts a count operation, based on switching of the electrically supplied coil phases by the control circuit, and stores its count value in a buffer register in accordance with a coincidence output of the comparator circuit.

11. The semiconductor device according to claim 10, wherein the control circuit controls to output the pulse control signal, controls selection of the selector, and controls initialization of the timer counter, in accordance with an interrupt process in response to the coincidence output of the comparator circuit, and wherein the initialization of the timer counter is based on a timing after an operation for storing the count value in the buffer register.

12. The semiconductor device according to claim 9, wherein the control circuit controls, in a high-speed rotation mode, the pulse generation circuit to output the pulse control signal for electrically conducting from the coil with one of the coil phases to a coil with another coil phase, controls the selector circuit to select a reference signal and a signal corresponding to a current flowing to a coil with an electrically non-conductive phase due to an effect of a magnetic flux of the rotor, determines a timing at which the selected signal corresponding to the current flowing to the coil with the electrically non-conductive phase is greater than the reference signal, based on an output of the comparator circuit, and controls switching of coils electrically conducted by the pulse generation circuit, in synchronization with the determined timing.

13. The semiconductor device according to claim 12, further comprising an A/D (Analog/Digital) conversion circuit which converts the signal corresponding to the currents flowing to the coils of the stator into a digital signal, wherein the control circuit controls, in a low-speed rotation mode, the pulse generation circuit to output a pulse control signal for electrically conducting the coil with one of the coil phases to the coil with another coil phase, controls the A/D conversion circuit to convert a signal corresponding to currents flowing to the electrically conductive coils and a signal corresponding to a current flowing to an electrically non-conductive coil due to the effect of the magnetic flux of the rotor, into digital signals, and controls switching of coil phases electrically conducted by the pulse generation circuit, in synchronization with a timing at which there is reversal of magnitude relation between an average value of sum of the converted signals and a digital signal of the signal corresponding to the current flowing to the coil with the electrically non-conductive phase.

14. An electrically-powered equipment comprising:

a brushless DC (Direct Current) motor which includes a rotor having a permanent magnet with a plurality of poles and a stator having coils with a plurality of phases;

a semiconductor device which selectively supplies currents to the coil phases of the brushless DC motor, and controls rotation driving of the rotor; and an operative mechanism which operates the brushless DC motor as a power source, and wherein the semiconductor device has a pulse generation circuit for generating a pulse control signal for selectively supplying a current to coils with a plurality of phases of the brushless DC motor, a selector circuit for selecting arbitrary two signals from a reference signal and detection signals corresponding to a current flowing to the coils, a comparator circuit for comparing the two signals selected by the selector circuit, a timer counter, and a control circuit, wherein the control circuit repeatedly controls an operation for the pulse generation circuit to output a pulse control signal for supplying electricity to one of the coil phases in a state where the rotor is stopped, an operation for the selector circuit to select a detection signal corresponding to a current flowing from the electrically supplied coil to two coils with other plurality of coil phases coupled thereto, from the detection signals, and an operation for the timer counter to measure a time until determination of a state in which the selected two detection signals coincide with each other based on an output of the comparator circuit, while sequentially switching the electrically supplied coil phases, thereby determining a stop position of the rotor with respect to the stator, based on relationship between a result of measurement operation by the timer counter and a coil phase in association with each other, and wherein the stop position of the rotor with respect to the stator is determined based on a relationship between an acquired count value and the plurality of coil phases in association with each other.

15. A semiconductor device which selectively supplies currents to a plurality of coil phases of a brushless DC (Direct Current) motor including a rotor having a permanent magnet with a plurality of poles and a stator having coils with the coil phases, and controls rotation driving of the rotor,
wherein, in a stopped state of the rotor, when electricity is supplied sequentially to a coil with one coil phase, detection is made on a difference of signals corresponding to currents flowing respectively to coils with other plurality of coil phases coupled to the electrically supplied coil phase due to an effect of a magnetic flux of a stopped rotor, using a comparator circuit and a timer inputting its comparison result, thereby determining a stop position of the rotor with respect to the stator, based on relationship between a detection result and a coil phase in association with each other,
wherein, in a rotation state of the rotor, detection is made on a timing at which a signal, corresponding to a current flowing to an electrically non-conductive coil due to the effect of the magnetic flux of the rotor, reaches a reference signal, when electrical conduction is made from a coil with one of the coupled coil phases to a coil with another coil phase, using the comparator circuit and the timer, thereby determining a rotation position of the rotor with respect to the stator, and
wherein the stop position of the rotor with respect to the stator is determined based on a relationship between an acquired count value and the plurality of coil phases in association with each other.

16. The semiconductor device according to claim 1, comprising:
a selector circuit;
a comparator circuit which compares two signals selected by the selector circuit; and
a timer counter which acquires a count value corresponding to a coincidence detection timing by the comparator circuit, and
wherein the selector circuit selects signals corresponding to currents flowing respectively to the coils with the coupled coil phases, for controlling determining the stop position of the rotor with respect to the stator.

17. The semiconductor device according to claim 1, comprising:
a selector circuit; and
a comparator circuit which compares two signals selected by the selector circuit,
wherein the selector circuit selects signals corresponding to currents flowing respectively to the coils with the coupled coil phases, for controlling determining the stop position of the rotor with respect to the stator,
wherein the comparator circuit forms a coincidence timing of the signals selected by the comparator circuit, and
wherein the stop position of the rotor with respect to the stator is determined based on relationship between an acquired count value and the plurality of coil phases in association with each other.

18. The semiconductor device according to claim 1,
wherein signals corresponding to currents flowing respectively to the coils with the coupled coil phases are selected for controlling determining the stop position of the rotor with respect to the stator,
wherein a coincidence timing of the signals selected is formed,
wherein a count value since a counting operation starts in synchronization with a timing of supplying electricity to the coil with one coil phase until the coincidence timing is acquired, and
wherein the stop position of the rotor with respect to the stator is determined based on relationship between the acquired count value and the plurality of coil phases in association with each other.

19. The semiconductor device according to claim 1, comprising:
a control circuit and
a pulse generation circuit connected to the control circuit,
wherein the control circuit controls, in a high-speed rotation mode, the pulse generation circuit to output a pulse control signal for electrically conducting from a coil with one of the coil phases to a coil with another coil phase, controls a selection of a reference signal and a signal corresponding to a current flowing to a coil with an electrically non-conductive phase due to an effect of a magnetic flux of the rotor, determines a timing at which the selected signal corresponding to the current flowing to the coil with the electrically non-conductive phase is greater than the reference signal, and controls switching of coils electrically conducted by the pulse generation circuit, in synchronization with the determined timing.

20. The semiconductor device according to claim 1, comprising:
a control circuit; and
a pulse generation circuit connected to the control circuit,
wherein the control circuit controls, in a high-speed rotation mode, the pulse generation circuit to output a pulse control signal for electrically conducting from a coil with one of the coil phases to a coil with another coil phase, and controls a selection of a reference signal and a signal corresponding to a current flawing to a coil with an electrically non-conductive phase due to an effect of a magnetic flux of the rotor.

* * * * *